United States Patent

[11] 3,601,588

[72] Inventor  Edgar H. Bristol, II
            Foxboro, Mass.
[21] Appl. No. 552,288
[22] Filed    May 23, 1966
[45] Patented Aug. 24, 1971
[73] Assignee The Foxboro Company
            Foxboro, Mass.

[54] METHOD AND APPARATUS FOR ADAPTIVE CONTROL
    37 Claims, 12 Drawing Figs.
[52] U.S. Cl. .................................................. 235/150.1,
                          244/77, 318/561, 235/151.34
[51] Int. Cl. ................................................... G05b 13/00
[50] Field of Search .......................................... 235/150.1,
            150.4, 151.34; 244/77, 77 M, ; 318/20.050,
                                    20.390, 20.395

[56]            References Cited
            UNITED STATES PATENTS
2,666,171  1/1954  Williams .................... 318/20.395
3,109,970  11/1963 Smyth ....................... 244/77 M X
3,214,660  10/1965 Smoot ....................... 318/20.395
3,216,676  11/1965 Brown et al. ................ 244/77 M
3,286,144  11/1966 Hill .......................... 318/20.390
3,391,316  7/1968  Ross ......................... 318/20.050
3,412,299  11/1968 Buscher et al. ............... 244/77 M X Primary Examiner—Malcolm A. Morrison
Assistant Examiner—Edward J. Wise
Attorney—David E. Hoppe ABSTRACT: The invention is for a method of self-adaptation of a feedforward type of model incorporated online in a control system supplying "anticipatory" control to a dependent system variable based on the value of an independent system variable. The feedforward model, for example, may employ a proportional and a bias function which together express a linear estimate of the modification of the independent system variable value required to compute a suitable control for the dependent system variable. The invention is for a procedure performed while the system is under control action, employing the steps of monitoring the condition of the independent system variable, or in some cases, the set point, and selecting in accordance therewith one of the feedforward model functions for an adjustment, which adjustment uses the system error signal in a feedback loop type of control action in order to reduce that error. Each such selection, together with the adjustment performed, acts to improve the model's estimate of the proper relationship between the value of the independent system variable and the value of the dependent system variable. Over a period of time, as the independent variable changes, several successive selections and adjustments will be made, and the model will express the best possible estimate, whether the model is a simple linear model, or is made to represent a more complex group of functions. The invention also includes apparatus for carrying out the adaptation. Applications are also included where the model is employed in other than the conventional feedforward control situations, the adaptation feature of the invention providing for automatic calibration of measurements, and for on-off control activity, for example.

INVENTOR.
EDGAR H. BRISTOL
BY David E. Hopper
ATTORNEY

INVENTOR.
EDGAR H. BRISTOL

INVENTOR.
EDGAR H. BRISTOL

INVENTOR.
EDGAR H. BRISTOL
BY David E. Hopfe
ATTORNEY

INVENTOR.
EDGAR H. BRISTOL

METHOD AND APPARATUS FOR ADAPTIVE CONTROL

This invention relates to adaptive systems generally and more particularly to controls having means for automatically adapting a feedforward model.

In processes where there is available a measurement primarily affected by a controlled variable, feedback control is commonly employed. The deviation of this process measurement from this selected process set point is employed to regulate the controlled variable in a manner to reduce this deviation. Feedback control can maintain the process measurement fairly close to set point if the process measurement is not subject to instabilities unrelated to the controlled variable, and if the process dead time is not significant.

Feedback control does not maintain the process measurement closely at set point under all conditions inasmuch as readjustment of the controlled variable depends upon the existence and detection of process measurement error. At times of set point step changes, for example, the process measurement error may become quite large. Further, process characteristics such as dead time will determine the length of time such measurement errors take to be reduced to their minimum operating values.

Where it is desired to hold a stricter control of the process measurement, feedforward control may be advantageously employed. Feedforward control does not depend on the existence of a process measurement error, but rather monitors a preponderant cause of a process measurement deviation from set point and furnishes an appropriate compensatory signal to the controlled variable to nullify and influence by such cause of deviation upon the process measurement.

Feedforward control uses a model which generally requires a prior analysis of the process and a selection of the most significant process characteristics as the basis for the model. According to the accuracy of a model, feedforward control maintains the process balance necessary for the process to remain at set point. The feedforward signal may, if the model is perfect, be precise enough to eliminate any process measurement deviation. In practice, the feedforward model is only approximate and therefore feedforward control is commonly supplemented by a feedback loop to finely adjust the process measurement to set point over a relatively long term.

The term anticipatory control is often applied to the feedforward method of control because it anticipates any process measurement error that would result from a process imbalance and takes immediate action to prevent such a measurement error from developing.

Feedforward control is possible if an independent variable significantly influencing the process measurement may be monitored; and if a stable relationship between the independent process variable and the controlled variable exists for each process set point selected. The term independent variable is used to describe a variable affecting the process, and in particular the process measurement, that is not regulated by the process control. The independent variable, of course, may be dependent upon factors external to the process and the process control. Such an independent variable may or may not be predictable, and may in some cases be determinable only by measurement, while in other cases may be preselected or ascertainable by other means.

The process-balancing relationship between the independent variable and the controlled variable is in effect approximated in the process model. The model is employed to operate upon the independent variable information signal and to compute an output suitable for regulating the controlled process variable. The mathematical operations performed by the model and any combining constants employed in these operations determine the relationship between input and output of the model. In practice, model constants are adjusted to approximate the relationship between independent and controlled variables as possible. Should process parameters change, this approximation of the feedforward model may deteriorate, and model modification may be required to regain optimum control.

This invention is directed to providing a method and means for automatically estimating the relationship between interdependent variables. The principle and method of the invention may be employed in a variety of applications, generally wherever it is convenient to automatically adjust a model representing the relationship between two variables.

If a sufficient number of process measurements were available and appropriate to adjust all the constants in a feedforward model, provision of a separate feedback loop for each constant would expedite a form of model adaptation. However, if the process information is limited, feedforward adaptation requires a more complex method.

Accordingly, it is an object of this invention to provide adaptation means for a feedforward model when the number of model functions to be adjusted exceeds the number of relevant process informations available.

It is another object of this invention to provide a self-adapting feedforward control method not requiring prior process analysis.

It is another object of this invention to provide a control system with a self-adapting feedforward model which will automatically optimize model constants on the basis of process information.

It is another object of this invention to provide a system for representing the relationship between variables employing a model having a plurality of constants which may be automatically adjusted by current information.

It is another object of this invention to provide an adaptive multiple constant feedforward control system using at least one of the constants in a feedback loop and using a plurality of the constants in a feedforward model configuration.

It is another object of this invention to provide a self-adapting feedforward control system for use with pneumatic hardware.

It is another object of this invention to provide a self-adapting feedforward control system for use with electronic hardware.

It is another object of this invention to provide a self-adapting feedforward control system that may be embodied by a computer program.

It is another object of this invention to provide a self-adapting feedforward model which may be employed to continuously calibrate an inaccurate process measurement with reference to an accurate process measurement.

It is another object of this invention to provide the appropriate logic for controlling a self-adapting feedforward model in a process control system.

It is another object of this invention to provide a self-adapting feedforward control model suitable for controlling a process requiring large changes in set point.

It is another object of this invention to provide a self-adapting feedforward control system employing as many constants as need be to satisfactorily approximate process parameters.

It is another object of this invention to provide a self-adapting feedforward control system that may be employed in conjunction with one or more uncontrolled variables.

It is another object of this invention to provide a self-adapting feedforward control system having self-tuning action initiated by incremental changes in the uncontrolled variable.

It is another object of this invention to provide for tuning of the constants of a feedforward control model initiated by appropriate control logic and using information derived from the correctness of a process measurement.

It is another object of this invention to provide a general feedforward control scheme which may incorporate any number of constants each of which may be selected for tuning by appropriate logic according to information derived from the process.

It is another object of this invention to provide feedforward control which tends to stabilize a model to most closely approximate the process without the necessity of process analysis or prior feedforward model adjustments.

These and other features of the invention will become apparent from the following detailed description thereof taken in conjunction with the several FIGS. of the drawings, in which.

Figure 1:
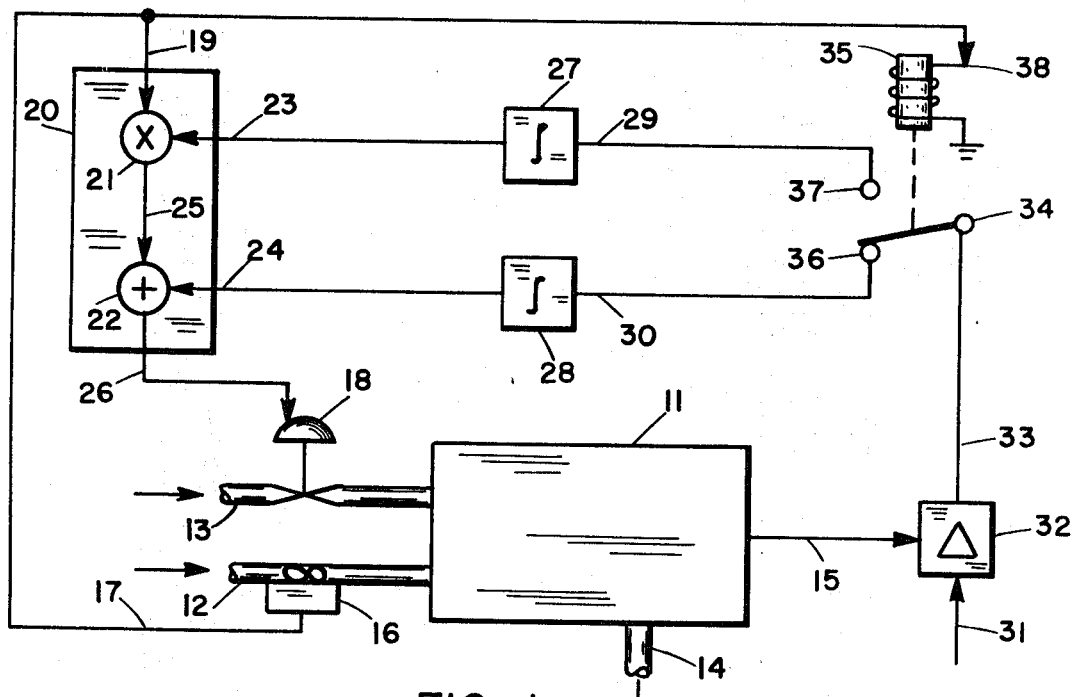
FIG. 1 shows a block diagram of an adaptive feedforward control for a process using a relay to perform the function of switching logic.

Referring to FIG. 1, a block diagram of a simplified self-adapting feedforward control system is shown. Process 11 is of the type that may benefit from the provision of a feedforward control. The independent variable 12 and the controlled variable 13 are both illustratively shown as inputs to process 11, and measurement 15 is illustratively taken from a point near process output 14. Process 11 is assumed to have a delay between a change in either input 12 or 13 and a consequent change in measurement 15 so that feedback control is not adequate to maintain measurement 15 satisfactorily close to set point 31 at all times. It is also assumed that for any change in independent variable 12 that will tend to upset process 11, and more particularly measurement 15 thereof, that there exists a change in controlled variable 13 that compensates for such an upset. That is to say, for each value of independent variable 12 there will exist a corresponding value of controlled ariable 13 for maintaining measurement 15 at a particular set point 31.

The c mponents of the adaptive control system for process 11 include feedforward model 20 consisting of multiplier 21 and summer 22, integrator 27 having an output to input 23 of multiplier 21, integrator 28 having an output of input 24 of summer 22, differencer 32 having inputs measurement 15 and set point 31 and providing at output 33 thereof the measurement deviation signal to switching contact 34 of relay 35. Relay 35 switches measurement deviation signal 33 between relay contacts 36 and 37, providing measurement deviation signal 33 to either input 30 of integrator 28 or to input 29 of integrator 27. In the deenergized condition of relay 35 a feedback loop for process 11 is formed illustratively starting from measurement 15, through differencer 32, through contacts 34–36 of relay 35, through integrator 28, through input 24 of summer 22 to output 26 of feedforward model 20 which regulates valve 18 at controlled variable 13. When relay 35 is deenergized any deviation of measurement 15 from set point 31 will be integrated by integrator 28, changing the level at input 24 of summer 22 so that output 26 of model changes valve 18 in a direction that will restore measurement 15 to set point 31 so that the measurement deviation signal 33 and input 30 to integrator 28 will approach zero and the feedback loop will stabilize.

In a similar manner, when coil 38 of relay 35 is energized by a sufficient level of independent variable measurement signal 17 supplied thereto from measurement device 16 monitoring independent variable 12, another feedback loop is formed illustratively starting with measurement 15, through differencer 32, through relay contacts 34–37, to input 29 of integrator 27, and thence to input 23 of multiplier 21, and from the output of multiplier 21 through input 25 of summer 22 to output 26 of feedforward model 20 and to valve 18. When relay 35 is energized this feedback loop produces an integrated level at input 23 of model 20 such that the output of model 20 regulates valve 18 in a direction to restore measurement 15 to set point 31.

Independent variable measurement signal 17 is provided to input 19 of feedforward model 20 and is coupled through the series configuration of multiplier 21 and summer 22 to output 26 of model 20. If model 20 is optimumly adjusted, that is, if the signal levels at input 23 of multiplier 21 and input 24 of summer 22 are correct, signal 17 from independent variable measurement device 16 will be operated on by multiplier 21 and summer 22 to provide an output signal 26 will correctly position valve 18 to maintain measurement 15 at set point 31. If either level 23 or level 24 is not correct, valve 18 will not be correctly repositioned in response to a change in the independent variable, and measurement 15 will deviate from set point 31. The adaptation process uses the measurement deviation signal 33 to reset levels 23 and 24 to their required values for optimum feedforward control.

Feedforward model 20 effectively multiplies the independent variable signal 17 by level 23 and adds level 24 to this product. Level 23 may be termed the proportional constant of feedforward model 20, and level 24 may be termed the bias constant. Thus, output 26 of model 20 is a linear function of independent variable 17 and this linear function incorporates a resetable offset. To the extent this linear function provided by model 20 approximates the actual relationship in the process between the independent variable 12 and the necessary value of controlled variable 13 to maintain set point 15, model 20 represents the process. If constants 23 and 24, the proportional and bias constant, are adjusted to their optimal values, feedforward model 20 represents the independent variable valve relationship in the process as closely as it may. In many complex processes there may exist no precisely repeatable relation between the independent and the controlled variable, and the optimum feedforward model in such a process would be adjusted to take advantage of whatever definitive independent variable valve relationship exists. It may be assumed that any feedforward control, even if its mathematical operations do not exactly reproduce the complexities of the process itself, is better than no feedforward control at all in a process exhibiting appreciable dead time between manipulation of a variable and a consequent effect upon the process measurement.

Figure 2:
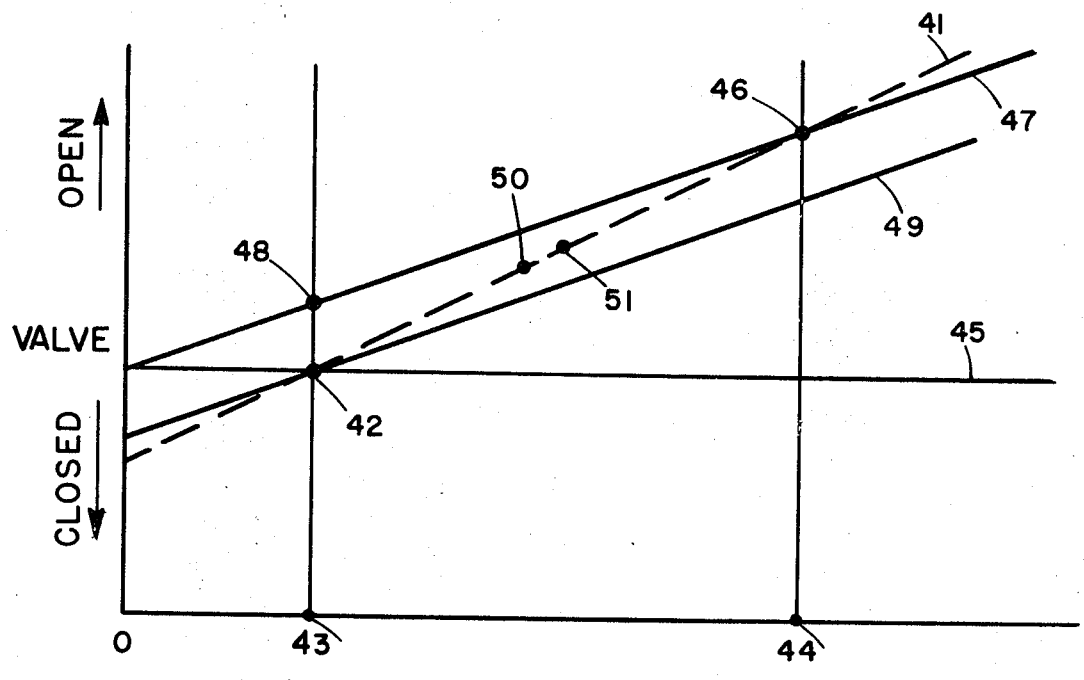
FIG. 2 is a graph of the relationship between an independent or uncontrolled process variable and the appropriate valve setting, and illustrates an adaptation sequence.

The adaptation sequence of feedforward model 20 may be illustrated by referring to FIG. 2. Dotted line 41 represents the relationship in process 11 between the independent or uncontrolled variable, represented horizontally, and the appropriate valve position, represented vertically, required to maintain a selected set point. Let it be assumed for the purpose of this discussion that process 11 is being started up, the independent or uncontrolled variable level is low, and that the levels of proportional constant 23 and bias constant 24 are both zero. Any deviation of measurement 15 from set point 31 will be applied through deenergized contacts 34–36 of relay 35 to integrator 28, and the resultant integrated level supplied to the bias constant 24 input to summer 22. This bias constant 24 eventually reaches a level adequate to bring process 11 to its set point, signified by reduction of deviation signal 33 to an insignificant value. This first operating condition after startup, in which set point is first reached by measurement 15, may be represented by point 42 on dotted line 41, indicating the correct valve position for independent or uncontrolled variable level 43. The condition of model 20 at the time the process first reaches set point may be represented by line 45 which is horizontal in FIG. 2; the model will be in this condition inasmuch as it has been assumed for the purpose of discussion that constants 23 and 24 are both started at zero, and only bias constant 24 at this time has reached a level for controlling the process.

Assuming the independent or uncontrolled variable then quickly jumps to a high level 44 sufficient to actuate relay 35, the output of feedforward model 20 will not immediately change appreciably, inasmuch as proportional constant 23 is still zero. As a consequence, measurement 15 will deviate from set point 31, providing an input to integrator 27 through energized contacts 34–37 of relay 35, thereupon building up a signal applied to proportional constant input 23 of feedforward model 20. The proportional constant 23 applied to multiplier 21 will eventually reach a level sufficient to produce an output 26 from feedforward model 20 that will set valve 18 to the proper position to bring measurement 15 back to set point 31. This valve position is represented by point 46 on line 41. Line 47 now represents this latest condition of feedforward model 20. It should be noted that the change in the model from the horizontal line 45 to sloping line 47 has been brought about only by the change in proportional constant 23, and that therefore the bias constant 24 is the same in both conditions. For this reason, both lines 45 and 47 originate at the same bias level at the zero measurement on the uncontrolled or independent variable measurement scale. That is, the bias factor is the only one contributing to the output 26 of model 20 when the uncontrolled variable is zero, and the bias factor is the same for both lines 45 and 47. As it is assumed the change in the independent variable is quite fast, there is no revision at bias constant 24 before relay 35 is actuated to reset the proportional constant.

If the uncontrolled variable next quickly returns to its first low level indicated by point 43, relay 35 then becomes deenergized and the feedback loop through summer 22 is restored. However, the previously adjusted proportional constant 23 now determines a significant contribution to input 25 of summer 22. Therefore, output 26 of model 20 will immediately order a new valve position shown as point 48 on model line 47. In order to have output 26 of model 20 order the correct valve position at point 42 bias constant 24 must be backed off. The feedback loop through summer 22 will accomplish this by acting on the basis of the deviation in measurement 15 from set point 31 that eventually occurs as a result of the inappropriate valve 18 positioning at point 48 that occurred the instant the uncontrolled variable 12 returned to low level 43.

This last adjustment of bias constant 24 serves to shift the uncontrolled variable valve relationship from that shown by line 47 to that shown by line 49. The shift from line 47 to line 49 is a uniform offset.

The next upward shift in the uncontrolled variable to high level 44 would cause the readjustment of proportional constant 23 necessary to bring process 11 to set point. This time the line representing model 20 would originate from the uncontrolled variable vertical zero at the same point as the origin of line 49 (because the bias is the same for both lines) and it would extend to intersect point 46. It can be seen that each successive alternation between actuation of the respective feedback loops serves to bring the resulting feedforward model 20 closer to the proper uncontrolled variable valve relationship represented by dotted line 41. Eventually, the sequence of alternate proportional and bias adjustments will bring model 20 as close as may be practically possible to the position of dotted line 41. At this time the proportional constant 23 and the bias constant 24 will be at their optimum adjustments. Line 41 is shown in FIG. 2 as a linear one, and therefore model 20 can be adjusted by means of its proportional and bias constants to approximate process line 41 quite closely.

The changes in the uncontrolled variable need not be limited to alternations between levels represented by points 43 and 44, but may be any change from one level to another of a sufficient magnitude to be discriminated. In the case of FIG. 1, this sufficient magnitude would be that required to switch relay 35 between energized and deenergized states.

The adaptation method of the feedforward model effectively takes into account the direction of change of the independent variable, the last significant adjustment made, and the requirement for an adjustment by an alternate feedback loop for model adaptation.

Any one adjustment of the model by the activated feedback loop has no significance considered by itself for determining the proper ratio between a bias and a proportional setting. It is only when resetting of one constant is referenced to the experience acquired by another constant that a significant model line can be determined. It takes two points, spaced from one another, to determine an offset and proportional function of the model. If either constant is adjusted at a value of the independent variable other than zero, the adjustment will imply elements of both bias and proportionality. It is because the proportional contribution has a heightened significance in the adjustment based on a relatively higher measurement of the independent variable that the self-adjustment procedure operates to eventually bring the feedforward model into a closest possible fit with the process.

The bias adjustment in order to be valid must be always made at a lower value of the independent variable than the value of the independent variable initiating the last significant proportional adjustment; conversely, every proportional adjustment must be made at a higher value of the independent variable than the value initiating the last significant bias adjustment.

Reversing the procedure, that is attempting to adjust the bias at higher values of the independent variable than those values employed for making adjustments of proportionality, will result in a feedforward model tending to maladjustment. The result will be a proportional term tending to increasing gain and an increasing offset in the error of the valve bias. Therefore, an essential element in the adaptation process is the proper ordering of adjustments of the constants in the feedforward model.

Resetting any constant twice in succession without an intervening adjustment of the other constant may or may not optimize the model: all adjustments of a constant prior to its last adjustment which did not experience an intervening adjustment of the alternate constant will be inconsequential in the adaptation process. For progressive adaptation of the model, constants must be reset alternately, to the extent one constant is continually adjusted model adaptation does not take place. In a stable process, one of the model constants will continuously be employed in the feedback loop selected, and the representation of the feedforward model will not change significantly until an upset in the independent variable initiates resetting of an alternate constant.

In general, the means employed for switching between the feedback loops resetting the constant of the feedforward model should include some provision for separating the respective levels of the uncontrolled variable used in the resetting of alternate constants. If both the constants of the feedforward model were adjusted at about the same level of the independent variable, tolerances in the equipment would magnify any errors. If, for example, integrator 28 were activated at point 50 on the uncontrolled variable valve line 41 and integrator 27 were activated at closely adjacent point 51, any small difference between the respective integrator outputs resulting from any other causes than the adaptation process would tend to displace line 41 from the proper adaptive slope. The improper displacement of line 41 would be magnified as points 50 and 51 approached each other.

Therefore, for increased reliability and accuracy, means should be included in connection with the activation of integrators 27 and 28 insuring that minor deviations of the uncontrolled variable should not initiate self-adapting action of model 20. Provision of a dead-band between activating levels of the independent variable insures the relative significance of each level of the independent variable selected for initiating the adaptation of the feedforward model.

Figure 3:
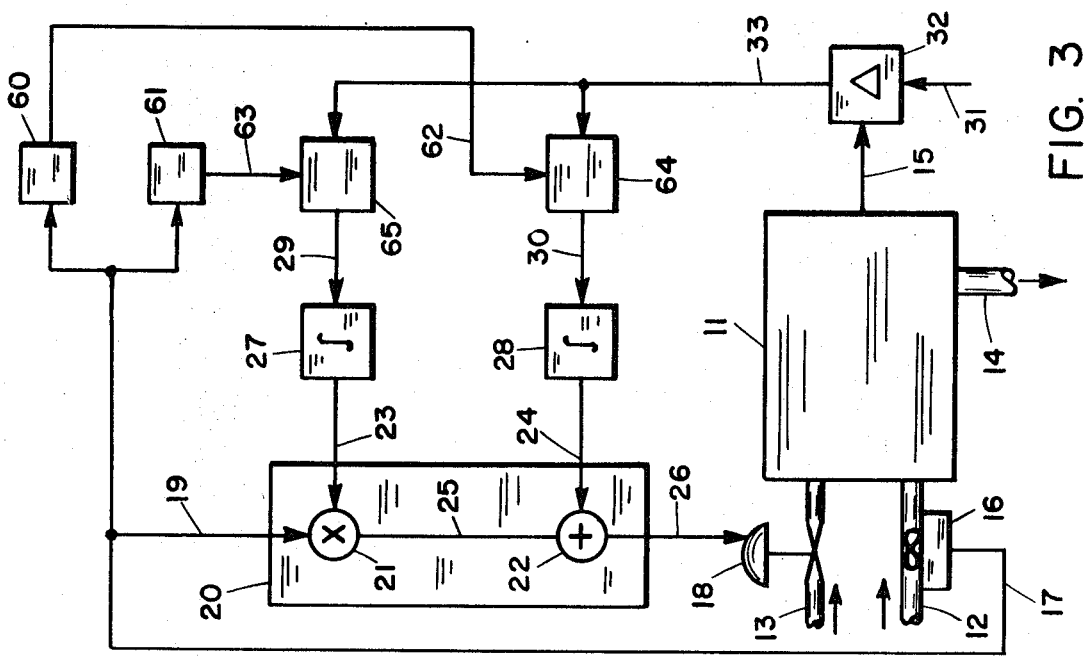
FIG. 3 shows a block diagram of an adaptive feedforward control for a process using switching logic based upon detecting two levels of the independent process variable.

A scheme which includes a dead-band for separating feedback loop adjustments is shown in FIG. 3, in which a level sensing and switching system is substituted for the simple relay 35 of FIG. 1.

Level detectors 60 and 61 are responsive to signal 17 representing the uncontrolled variable. The outputs of detectors 60 and 61 are supplied to inputs 62 and 63 of switches 64 and 65 respectively. Switches 64 and 65 connect the deviation 33 in measurement 15 from set point 33 to inputs 29 and 30 of integrators 27 and 28 respectively. Level detector 60 is set to actuate switch 64 over a predetermined low range of the uncontrolled variable. Level detector 61 is set to actuate switch 65 over a predetermined high range of the uncontrolled variable. In selecting the levels for actuation of switches 64 and 65, a dead-band is provided over an intermediate range of the uncontrolled variable so that neither switch 64 nor 65 is actuated over that range. As a consequence, the self-adapting operation of model 20 will occur during low or high levels of the uncontrolled variables, and will remain at its last adjustment during such times as the uncontrolled variable is at an intermediate level. This arrangement assures that integrators 27 and 28 will not be set by error signals occurring closely on the uncontrolled variable valve line 41; thus the representation of line 41 by feedforward model 20 will be reliable and accurate. The switching logic of FIG. 3 is appropriate in a process in which it is reasonably certain the uncontrolled variable will not remain for an appreciable length of time at the predetermined intermediate range, during which time there is no connection between measurement 15 and valve 18, and no feedback loop exists to provide close control of measurement 15 over the long term.

Figure 4:
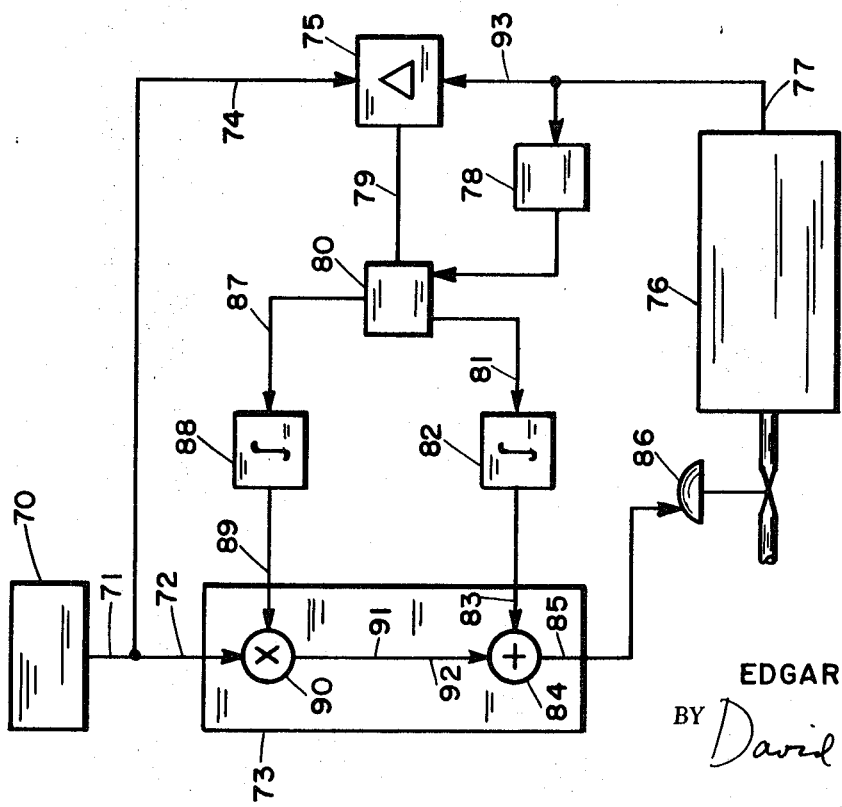
FIG. 4 shows a block diagram of an adaptive feedforward control for a process in which a programmed signal is the independent variable.

Referring now to FIG. 4, a block diagram of a self-adapting feedforward control system is shown in which a programmed signal provides a varying set point to the process. It is assumed that there exists a determinable relationship between the process set point and the appropriate valve position. If so, model 73 can be used to compute the correct valve position from varying set point information.

Programmer 70 generates a varying set point, provided at output 71 and fed to input 72 of feedforward model 73 as well as to input 74 of differencer 75. Process 76 provides measurement 77 which is to be controlled to varying set point 71 from programmer 70. Measurement 77 is fed to input 93 of differencer 75, the output 79 of differencer 75 being the measurement error.

During the stage of the program producing a relatively low value of set point, measurement error 79 is switched through relay 80 to input 81 of integrator 82. The output of integrator 82 is supplied to input 83 of summer 84, and the output 85 of summer 84 is supplied to control valve 86 to reduce any measurement error. Thus, the loop through integrator 82 operates in a feedback mode. When measurement 77 ramps up to a preselected threshold level, detector 78 actuates relay 80 to connect output 79 of differencer 75 to input 87 of integrator 88, disconnecting input 81 of integrator 82 at this time. Integrator 88 thereby integrates any measurement deviation from set point over this portion of the upward-ramping measurement 77 and supplies the integrated value to input 89 of multiplier 90.

Output 91 of multiplier 90 is connected to input 92 of summer 84, both together thus forming feedforward model 73. The constant supplied by integrator 88 to multiplier 90 of feedforward model 73 determines the proportional relationship between set point 71 and the valve position. The constant supplied by integrator 82 to summer 84 determines the valve bias. The outputs of integrators 82 and 88 tend to retain their last achieved value in the absence of signals at their inputs, and feedforward model 73 will tend to stabilize at a condition to minimize measurement 77 deviation from the varying set point 71 over the programmed time. To the extent that a nearly linear relationship exists between varying set point 71 and the appropriate setting of valve 86, feedforward model 73 can approximate this relationship closely after a sufficient number of alternating adjustments of the bias and proportional constants.

This programming of the process set point eliminates the need for dead-banding between adjustments of the constants of feedforward model 73. The ramping of set point 71 guarantees that the effective integrations that occur in integrators 82 and 88 will represent effective separations along the set point-valve relationship line; it is not possible for integrators 82 and 88 to achieve outputs representing the same or only slightly different set points.

As an alternate method of controlling relay 80, the programmer 70 may directly provide a preselected switchover control to relay 80, substituting for the control of level detector 78. That is, switchover of the feedforward model adjustment may be predetermined at a certain time rather than effected by the achieving of a certain level by process measurement 77.

Other methods for switching between feedback loops may be employed, considering such factors as the relative direction of the most recent significant change in uncontrolled variable. If the logic is based on direction of change rather than the level of the uncontrolled variable, more efficient adaptation is possible since adaptation follows any significant change in direction of the uncontrolled variable rather than just those which carry the uncontrolled variable across a fixed threshold. Another factor to consider is the separation in time of switching between the inputs to the integrators. Separation in time permits a settling of the process response to valve actions before adaptation takes place, thus tending to eliminate errors in adaptation arising from the dynamic character of the process.

Figure 5:
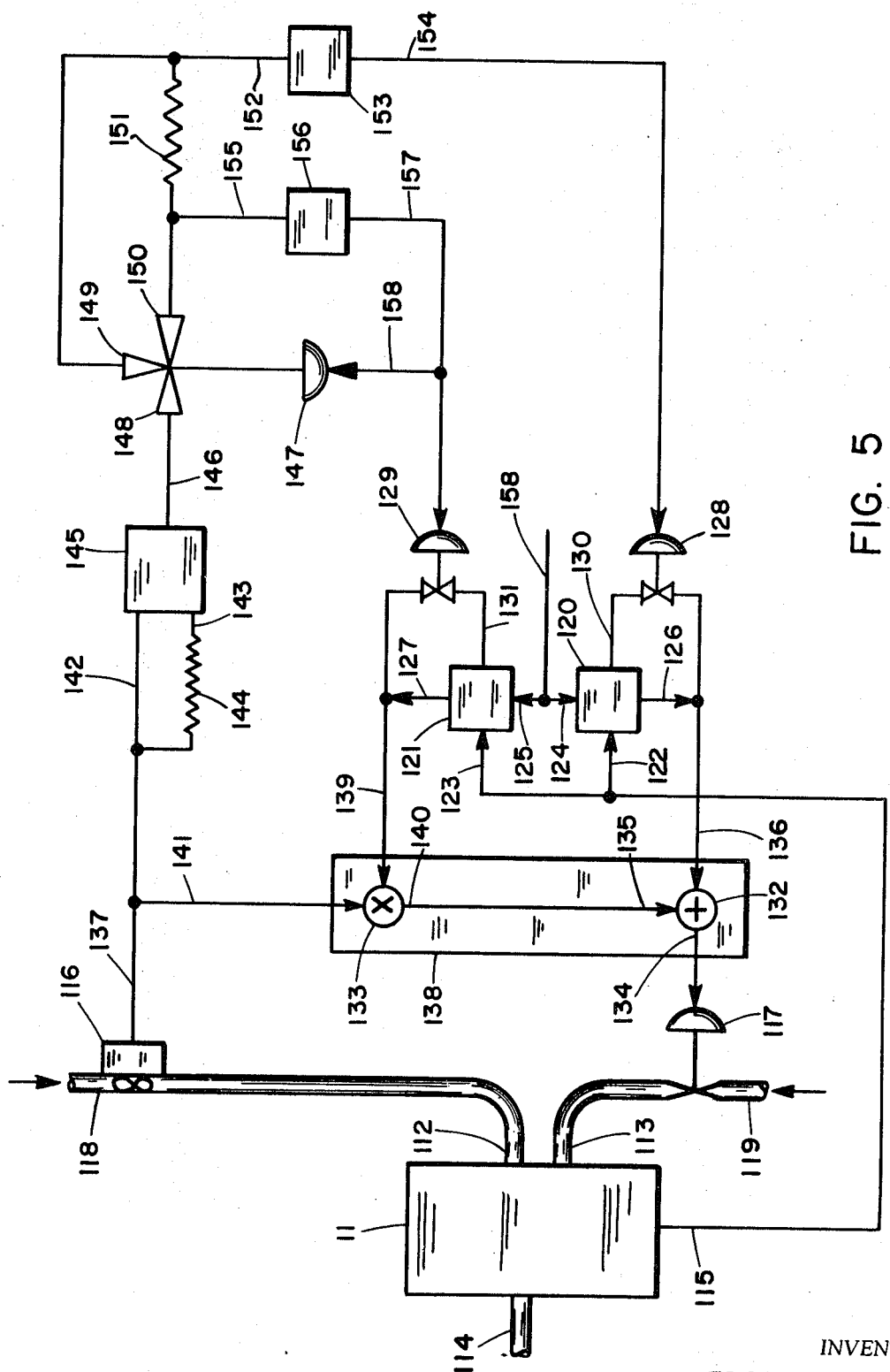
FIG. 5 shows a block diagram of an adaptive feedforward control system employing pneumatic components and basing switching logic upon minimum rate detection.

The embodiment shown in the block diagram of FIG. 5 illustrates an arrangement for adaptive feedforward control of a process facilitated with pneumatic components and including logic for switching the feedback loops incorporating sensing of the rate of change of the independent variable and separation in time of loop switching.

Process 111 has an input 112 supplied by uncontrolled variable 118, and a second input 113 supplied by a controlled variable 119. Process 111 has an output 114 therefrom, and process 111 has a measurement 115 supplied therefrom to be controlled to a set point 158. Uncontrolled variable 118 is monitored by measurement device 116 which measures the uncontrolled variable in appropriate units. The controlled variable input 119 is regulated by valve 117.

Two proportional plus reset controllers 120 and 121 are employed in conjunction with the self-adapting feedforward model 138, each controller supplied with the same process measurement 115, and each using a common set point 158. Process measurement 115 is connected to measurement input 122 of controller 120 and to measurement input 123 of controller 121. Process set point 158, to which measurement 115 is to be held, is supplied to set point input 124 and set point input 125 of controllers 120 and 121 respectively. Controller 120 generally operates in a feedback loop with process 111, having an output 126 dependent on the deviation of measurement 122 from set point 124; output 126 is supplied to control valve 117 via summer 132 of feedforward model 138. Output 134 of summer 132 is connected to operate control valve 117 thereby providing a feedback control loop in which valve 117 is operated by the deviation of measurement 115 from set point 158 in such a way as to bring measurement 115 back to set point 158.

Multiplier 133 in combination with summer 132 provides a linear representation of the response of process 111 to changes in uncontrolled variable 118. Measurement 137 from uncontrolled variable monitor 116 is provided to input 141 of multiplier 133 of feedforward model 138. Output 140 of multiplier 133 is connected to input 135 of summer 132. The second input 139 of multiplier 133 is derived from output 127 of controller 121. Controller 120 has its output 126 providing input 136 to summer 132, while controller 121 has its output 127 providing input 139 to multiplier 133.

During the times measurement 115 is at set point, the outputs 126 and 127 from controllers 120 and 121 respectively will be at stable levels, thus providing constant input levels to summer 132 and multiplier 133 respectively. The signal output of feedforward model 138 supplied to valve 117 equals the uncontrolled variable measurement 137 multiplied by the level at input 139 to multiplier 133 plus the level at input 136 to summer 132.

Variations of measurement 115 from set point 158 will produce proportional changes in outputs 126 and 127 of both controllers 120 and 121, thereby changing the constants supplied to feedforward model 138, tending to operate valve 117 and bring process 111 back to its set point 158. This proportional feedback-type of action effectively operates through the two controllers 120 and 121 in parallel, and its effect will be overcome once reset control has built up; from the point of view of adaptation the proportional control action can be ignored. Only the reset or integrating action is significant.

Controllers 120 and 121 are basically standard proportional and reset controllers in which the error signal is developed as the difference in pressure of opposing bellows at one end of a lever, one bellows having a pressure representing measurement 115, the other having a pressure representing set point 158. The opposite end of the lever has applied to it two other opposing bellows connected by a restrictive passage. One of the bellows, called the proportional bellows, is supplied with a pressure so as to balance the lever. The second bellows, called the reset bellows, is supplied with this same balancing pressure delayed by the action of the restrictive passage.

Controllers 120 and 121 are each modified from this standard configuration by the provision of a valve in the restrictive passage between its proportional and its reset bellows. Valve 128 is inserted in the restrictive passage 130 between the proportional bellows supplying output 126 and the reset bellows of controller 120. Similarly, valve 129 is inserted in the restrictive passage 131 between the proportional bellows supplying output 127 and the reset bellows of controller 121. At such times as valve 128 and 129 closes, the pressure locked into the respective reset bellows is simply repeated at the controller output so long as the measurement is at set point, and this output is supplied to the feedforward model 138. That is, when valve 129 is closed, which is the normal state for valve 129 when the process is operating under static conditions as well as under negative-going uncontrolled variable changes, the pressure locked into the reset bellows of controller 121 is repeated at output 127 and supplied as a constant to input 139 of multiplier 133 of feedforward model 138. Thus, during static conditions and negative-going changes in uncontrolled variable 118, multiplier 133 has effectively a constant level supplied to its input 139. The uncontrolled variable measurement 137 is multiplied by the constant at input 139 and passed on to summer 132. Summer 132 thereupon modifies the feedforward signal before passing it on to valve 117 by adding to it the level at output 126 of controller 120. Valve 128 is normally open during static conditions and negative-going uncontrolled variable changes, so that controller 120, operating in a feedback loop, provides a sufficient output 126 to bring the process to set point under set point changes and unanticipated upsets. In addition, the output 126 of controller 120 provides the bias constant for the model.

When the uncontrolled variable 118 becomes positive-going, valve 128 is first locked up, and the signal at output 126 is thereby retained in the reset bellows of controller 120. Thus, the bias constant is effectively memorized. After a time delay, valve 129 will open and if the feedforward model constant set into multiplier 133 is not accurate, the measurement 115 deviation from set point 158 will produce a new output 127 of controller 123 more appropriate to bring the process back to set point. Thereafter, when the process stabilizes the new level at output 127 will be locked into the reset bellows of controller 121 by valve 129, thereby setting into multiplier 133 the proportional constant represented and effectively memorized in the reset bellows.

The pneumatic logic controlling the adaptation process of the system of FIG. 5 is actuated by a preselected minimum rate of increase in the level of the uncontrolled variable Output 137 representing the uncontrolled variable, besides being supplied to input 141 of the feedforward model 138 as noted above is also provided to input 142 of differencer 145 and through restrictor 144 to input 143 of differencer 145. Differencer 145 is effectively a rate-measuring device, producing an output exceeding a nominal value (3 p.s.i.) which excess is proportional to the rate of increase of uncontrolled variable signal 137. Differencer 145 determines the differences between the inputs at 142 and 143 and conveniently multiplies this difference by a fixed constant and adds another fixed constant thereto, providing the result of this computation to output 146 thereof. In this case the selected added constant is 3 p.s.i. Thus under static conditions, output 146 is 3 p.s.i. For output 146 to increase above 3 p.s.i., input 142 must be higher than the input at 143 of differencer 145. Owing to the action of the restrictor 144, input 142 must be increasing at a sufficient rate so that the pressure at input 143 lags behind the pressure at input 142. To the extent that the pressure at input 142 exceeds the pressure at input 143, the output 146 is higher than the static 3 p.s.i. signal normally provided.

Output 146 of differencer 145 is connected to input 148 of pneumatic selector 147. At such times as input 158 of pneumatic selector 147 has no signals supplied thereto, the signal at input 148 is passed directly to output 149 of pneumatic selector 147. Output 149 is connected to input 152 of air relay 153. Air relay 153 is adjusted to trip at 6 p.s.i., at input 152 thereof, thereupon providing 20 p.s.i., to output 154 which is connected directly to operate valve 128 associated with controller 120. Thus, when input 142 exceeds input 143 of differencer 145 by a predetermined amount owing to the rate of increase of measurement 137, output 146 will exceed 6 p.s.i., and passing through pneumatic selector 147 will actuate relay 153 thereby switching valve 128 from its normally opened condition to a closed one. As a consequence the pressure in the reset bellows of controller 120 is locked up and controller 120 repeats the pressure in its reset bellows at its output 126 assuming measurement 115 is at set point. If no further increase in the uncontrolled variable occurs input 143 will soon approach input 142, and output 146 of differencer 145 will drop below 6 p.s.i., relay 153 will thereupon open valve 128, allowing the self-adaptive system to return to its normally operating condition.

If, on the other hand, the uncontrolled variable continues to increase and output 146 of differencer 145 reaches a level of 15 p.s.i., or more, output 149 of pneumatic selector 147 will be provided with this 15 p.s.i., signal. Restrictor 151 connects output 149 of pneumatic selector 147 to input 155 of pneumatic relay 156; after a time delay restrictor 151 will pass the 15 p.s.i., signal to input 155. Pneumatic relay 156 is set to trip at 15 p.s.i., and thereupon its output 157 will provide 20 p.s.i., to valve 129 and to the control input of pneumatic selector 147. This 20 p.s.i., from output 157 of relay 156 will open valve 129 and at the same time switch output 146 of differencer 145 from output 149 of pneumatic selector 147 to output 150 thereof. This last action provides a direct connection from output 146 to input 155 of pneumatic relay 156, keeping relay 156 tripped only for such length of time as the output 146 of differencer 145 is 15 p.s.i., or above. This arrangement allows relay 156 to drop out first should the uncontrolled variable 118 cease to increase, thereby closing valve 129 first before reopening valve 128.

During such time as both relays 153 and 156 are actuated thereby closing valve 128 and opening valve 129, the pressure in the reset bellows of controller 120 is locked and output 127 of controller 121, operating in its feedback loop, adapts to the proper level to provide a correct valve position signal from feedforward model 138. This adaptation of controller 121 will cease when the uncontrolled variable stops increasing. Output 127 is thereupon effectively memorized in the reset bellows of controller 121 and provides the proportional constant to feedforward model 138.

When the uncontrolled variable stops increasing, the level at output 146 of differencer 145 will drop below 15 p.s.i., immediately restoring relay 156 to its normal condition and closing valve 129; at the same time relay 156 restores pneumatic selector 147 to its normal condition, thereby restoring output 146 of differencer 145 to input 152 of relay 153. When this output 146 drops below 6 p.s.i., relay 153 is consequently restored to its normal condition and the entire system is then in its normal static operating mode.

This logic effectively provides a dead-band and separation in time of valve actuation insuring that valve 129 opens after the closing of valve 128 and also insuring that valve 129 closes before valve 128 opens again. That is, valve 129 is only allowed to open intermediate a longer time span during which valve 128 is closed. This insures that a significant rate of change in uncontrolled variable 118 must occur before self-adaptation is initiated in the positive direction and it also insures that the two constants at outputs 126 and 127 of controller 120 and 121 respectively are not allowed to adapt at points too closely spaced on line 41 of FIG. 2, as explained above. Also, if both valves 128 and 129 were opened simultaneously, the adaptation would proceed before the process has settled out and tuning may be influenced by dynamic effects in the response. The result would be a possibly erroneous steady state model of the valve-uncontrolled variable relationship. The time delay between times of locking of the bias constant and unlocking of the proportional constant also guarantees that adaptation does not take place on short term transient changes in the uncontrolled variable but only on changes which represent trends or are sufficiently long term in duration as to provide valid steady state information.

Figure 6:
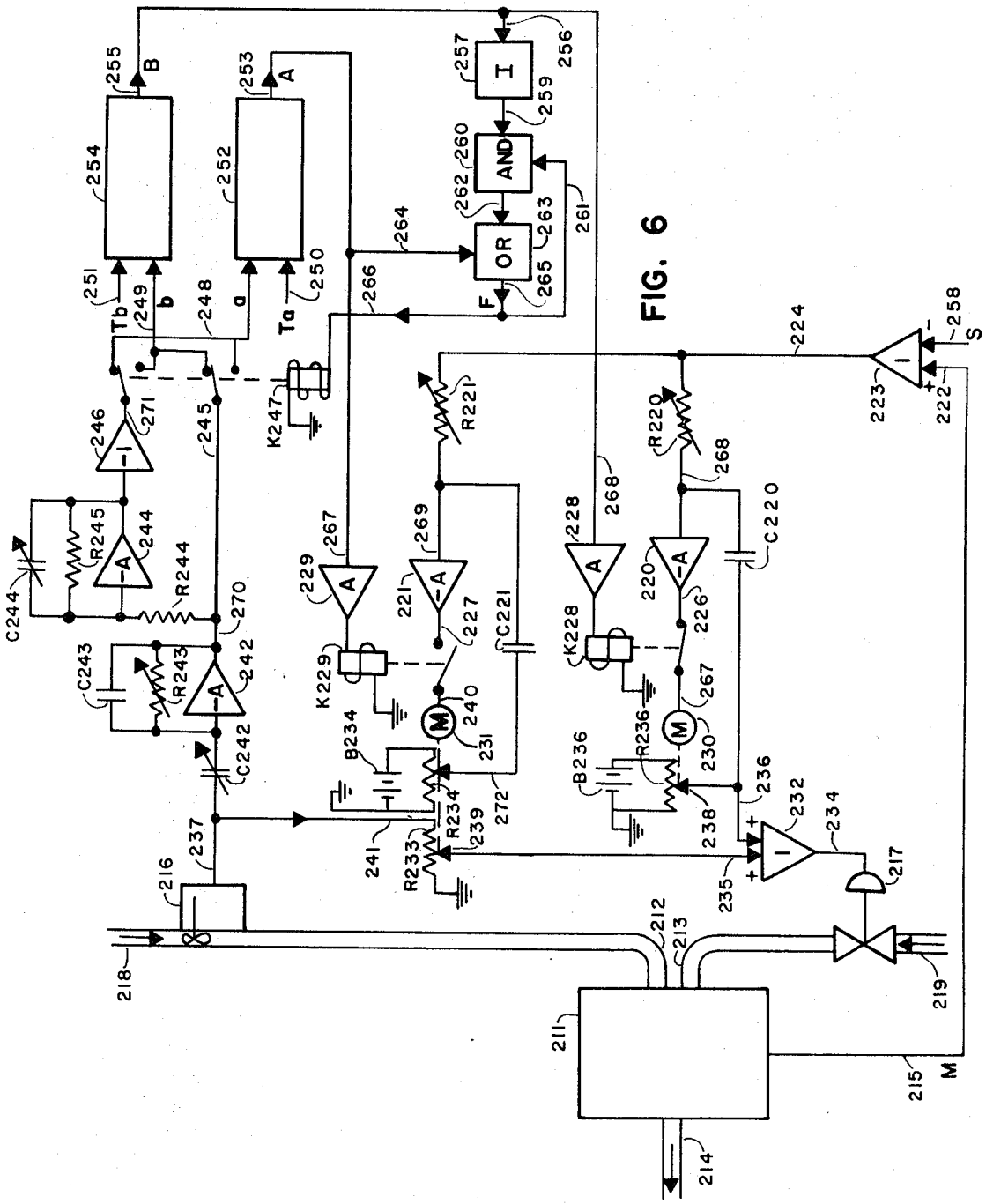
FIG. 6 shows a block diagram of an adaptive feedforward control system employing electrical components and basing switching logic upon minimum rate detection.

FIG. 6 is a block diagram of a self-adaptive system embodying the invention, showing a system based upon the use of conventional electrical and electronic hardware. The arrangement is somewhat similar to the arrangement of FIG. 4, except that the logic is modified to take advantage of the increased flexibility obtainable from electrical components.

Process 211 has uncontrolled variable input 212 and controlled variable input 213, and output 214. Valve 217 operates to regulate controlled variable 219. Measurement device 216 monitors the flow of uncontrolled variable 218. Measurement 215 is obtained from the process, and is to be controlled to set point 258. Signal 237 from monitoring device 216 is applied to input 241 of potentiometer R233. Potentiometer R233 represents a proportionality constant of the feedforward model at its wiper arm 239. That is, the setting of arm 239 of potentiometer R233 taps off a constant proportion of the uncontrolled variable monitoring signal 237, thereby representing a fixed ratio between the level of the uncontrolled variable and the valve actuation in the feedforward model. The signal at arm 239 of potentiometer R233 is connected directly to input 235 of summing amplifier 232. A second input 236 to summing amplifier 232 is obtained from arm 238 of potentiometer R236. Bias source B236 supplies a fixed potential across potentiometer R236; thereby the setting of arm 238 picks off a fixed potential proportional to the arm 238 setting. Summing amplifier 232 simply adds the fixed potential at arm 238 to the selected proportion of the uncontrolled variable signal appearing at input 235 of summing amplifier 232. Output 234 of summing amplifier 232 is connected to operate valve 217. In effect, the feedforward model made up of potentiometer R233 and summing amplifier 232 operates in a similar manner as the feedforward models discussed in connection with the previous figures.

Motor 231 employs a worm gear drive to operate arms 239 and 272 of potentiometers R233 and R234. The arms 272 and 239 are mechanically coupled together. Input 240 of motor 231 is normally disconnected by the action of deenergized relay K229 during static operating conditions and negative-going uncontrolled variable changes. The worm gear insures that potentiometers R233 and R234 will retain the last readjustment made by motor 231. Thereby arm 239 remains at its last positioned point on potentiometer R233 thereby supplying a fixed proportion of signal 237 to input 235 of summing amplifier 232 during such conditions of operation.

Motor 230 operates through a worm gear drive to operate arm 238 of potentiometer R236. Under static conditions of process operation and for negative-going load changes, input 267 of motor 230 is connected through energized relay K228 to output 226 of amplifier 220. The deviation in process measurement 215 from set point 258 is applied to input 268 of amplifier 220, via differential amplifier 223 and variable input resistor R220. Capacitor C220 feeds the signal appearing at arm 238 at potentiometer R236 back to input 268 of amplifier 220, thereby making up a circuit having an integrating action with respect to output signal 224 of differential amplifier 223. Changes in measurement signal 215 cause a change in input 268 of amplifier 220, causing motor 230 to run arm 238 of potentiometer R236 to a new point. The change in electrical pickoff by arm 238 is fed back through capacitor C220 to input 268, providing a negative feedback signal which opposes the change in input 268 signal level and thereby operates the circuit comprising resistor R220, amplifier 220, capacitor C220, and motor 230 and potentiometer R236 in an integrating mode of operation. Variable resistor R220 controls the integrating constant of this circuit. Thereby, this loop provides an integral feedback type of operation during normal process operation and negative-going load changes, during which potentiometer R236 is varied to bring the process to set point.

During positive-going load changes the logic associated with the adaptive control system operates to deenergize relay K228, disabling motor 230, and thus keeping potentiometer R236 in its last positioned pickoff point. During positive-going load changes, relay K229 will be energized, thereby connecting the input 240 of motor 231 to the output 227 of amplifier 221. Thereby the deviation in measurement 215 from set point 258 is allowed to operate the integrating circuit comprising resistor R221, amplifier 221, capacitor C221, motor 231 and potentiometer R234. Variable resistor R221 controls the integrating constant of this circuit. The adjustment of the feedforward model is made in a manner similar to the adjustment already described.

It may be noted in connection with the embodiments of FIGS. 5 and 6, that for static conditions only, either the proportional loop or the bias loop may be selected for the feedback operation. That is, feedback may be made to take place through the multiplier section of the feedforward model rather than through the summing portion while the process is stable.

The remaining components of FIG. 6 perform functions for recognizing a predetermined rate and amplitude of postive-going changes in the uncontrolled variable and functions for properly sequencing operations contributing to the adjustment of the respective constants of the feedforward model.

Amplifier 242, capacitor C242, capacitor 243 and resistor 243 comprise circuitry performing the function of discriminating the rate of change of the uncontrolled variable signal appearing at output 237 of device 216. A sufficiently rapid rate of positive-going uncontrolled variable signal 237 will appear as a negative signal at output 270 of amplifier 242 having an amplitude sufficient to operate the subsequent logic. Output 270 of amplifier 242 is coupled to pole 245 of relay K247, in its deenergized condition connecting directly to input 249 of threshold detector 254. Output 255 of threshold detector 254 is normally a signal signifying a logical "one" except when input 249 becomes more negative than a reference $T_b$ supplied to input 251 of level detector 254. When input 249 becomes more negative than a reference $T_b$, output 255 goes to a logical "zero," deenergizing relay K228 and thereby disabling the adjustment of the summing loop in the feedforward model.

The circuit consisting of resistor R244 coupling output 270 of amplifier 242 to the input of amplifier 244, together with capacitor C244, resistor 245, and inverter 246 make up a time-delaying circuit which delays the transfer of the negative-going signal at output 270 to pole 271 of relay K247 a predetermined time. The signal at pole 271 is connected through a deenergized contact of relay K247 to input 248 of level detector 252. When the signal at input 248 becomes more negative than a reference $T_a$ supplied to input 250 of detector 252, output 253 goes from a logical "zero" to a logical "one." Reference $T_a$ is more negative than reference $T_b$. When output 253 of level detector 252 goes to a logical "one," relay K229 is energized, enabling the proportional section of the feedforward model adjustment.

At such delayed time as K229 is energized, output 253 which is also connected to input 264 of OR-gate 263, thereby produces a logical "one" at the output thereof, serving to energize relay K247. Relay K247 when energized reverses pole signals 271 and 245, supplied to inputs 249 and 248 of detectors 254 and 252, thereby supplying signal 271 to input 249 and supplying signal 245 to input 248. At this time, relay K247 is energized as a result of either the logical "one" at output 253 of detector 252 or by the logical "one" output of AND-gate 260 so long as output 255 remains logical "zero," which logical "zero" is inverted by inverter 257 and supplied to AND-gate 260 as a logical "one." The other AND-gate input 261 is a logical "one" from the output 265 of OR-gate 263. Both level detectors 254 and 252 must be returned to their static conditions for relay K247 to deenergize. This insures that the enabling of the proportional section of the feedforward adjustment takes place during an interim time during which the bias adjustment is disabled. The use of electrical logic permits a symmetrical adaptation process wherein the positive uncontrolled variable change activates detector 254, then detector 252 and relay K247 together, and negative changes actuate detector 252 and then detector 254 and relay K247 together.

Figure 7:
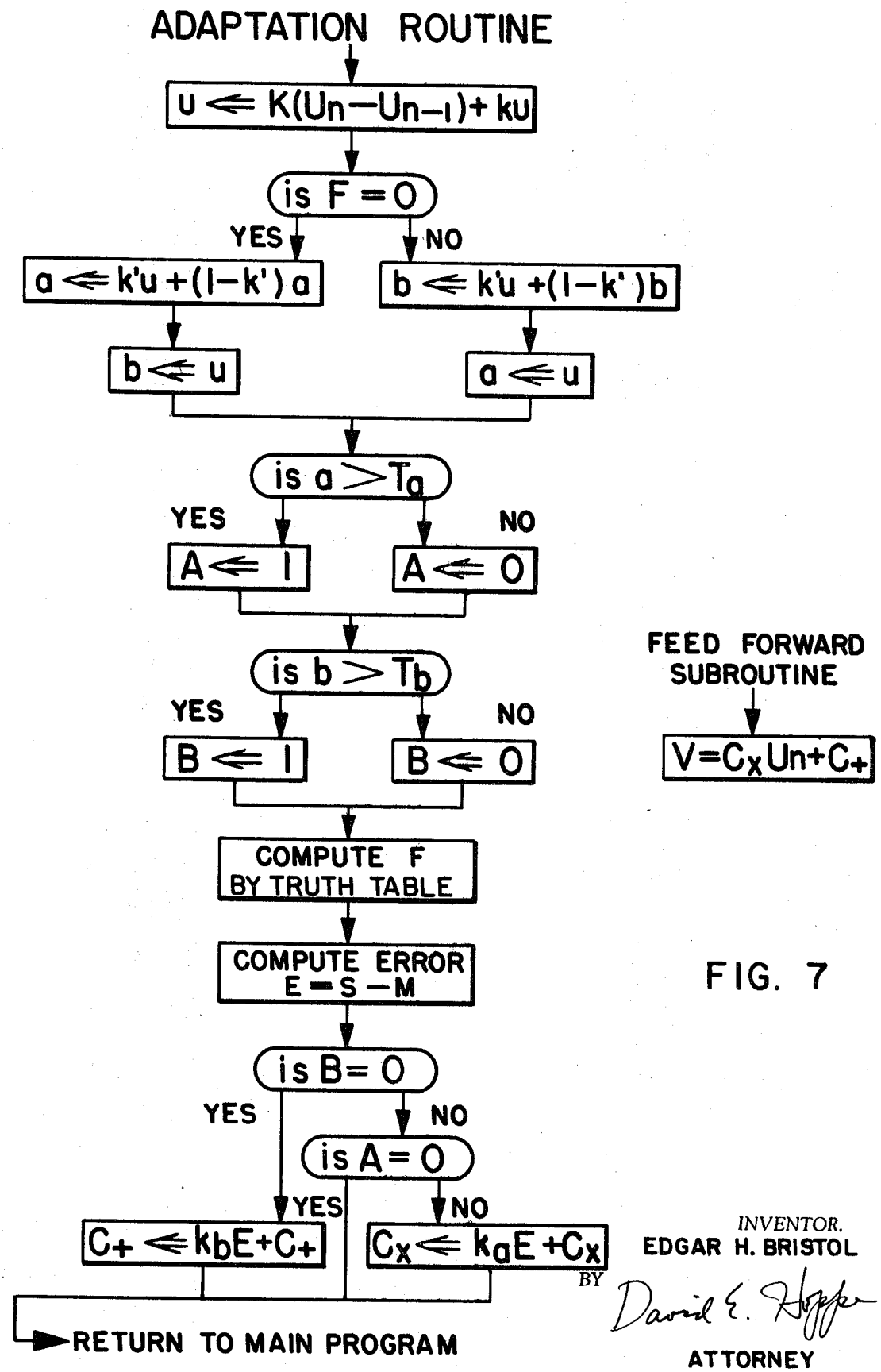
FIG. 7 is a computer flow chart for an adaptive feedforward control method embodying the invention.

FIG. 7 shows a logical flow chart for a computer implementation of the adaptive control system of FIG. 6. This flow chart shows one of many possible such implementations. A computer programmed on the basis of this flow chart calculates the rate and direction of change of the uncontrolled variable, a lagging function of this rate of change is generated, comparison with predetermined reference levels is performed, functions of the switching logic of FIG. 6 are executed, and the feedforward model constants are updated.

Referring to the flow chart of FIG. 7, the terms:

$U_n$, $U_{n11}$, V, $u$, $a$, $b$, M, $C_x$, $C_+$, A, B, F are stored as system variables and the terms:

K, $k$, $k'$, $k_a$, $k_b$, $T_a$, $T_b$, S are stored as system constants.

$U_n$ is the present value of uncontrolled variable
$U_{n11}$ is the past value of uncontrolled variable
V is the present value of valve
M is the present value of output measurement, and
S is the present value of set point The function F shown in the left-hand column of the truth table is computed a logical "zero" or "one" according to the logical conditions of A, B and F at the time of computation request as shown in the columns to the right.

TRUTH TABLE

| A | B | F | F |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | |
| 1 | 0 | 1 | |
| 1 | 1 | 0 | 1 |
| 1 | 1 | 1 | 1 |

In general, the functions indicated in the flow chart of FIG. 7 are the logical equivalent of the functions performed by the components of FIG. 6.

The computation $$u \Leftarrow K(U_n - U_{n-1}) + ku$$

effectively performs the function of amplifier 242 and associated circuitry in FIG. 6. The computations $$a \Leftarrow k'u + (1-k')a$$

and $$b \Leftarrow k'u + (1-k')b$$

effectively perform the function of amplifier 244 and associated circuitry in FIG. 6.

Figure 8:
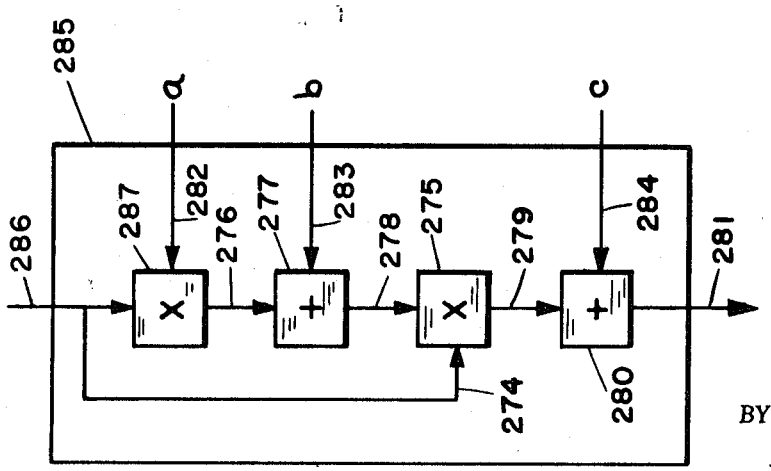
FIG. 8 shows a three-constant feedforward model.

In many processes, the relationship between the uncontrolled variable and the appropriate valve setting will be nonlinear. The two-constant feedforward models will adapt to a best fit to the process characteristics over the uncontrolled variable working range. Therefore, it is possible to improve the response of any process by using a two-constant model. Additional elements may be added to a feedforward model to compensate for any nonlinearities such as, for example, a quadratic nonlinearity. FIG. 8 shows a three-constant feedforward model which may be employed in a manner similar to the two-constant models discussed. In the two-constant model the valve setting is simply proportional to the uncontrolled variable and modified by a fixed bias. The three-constant model is obtained by adding a squaring function to the proportional and bias functions described.

Model 285 has an uncontrolled variable at input 286 thereof. Input 286 connects to input 287 of multiplier 273 as well as to input 274 of multiplier 275. Multiplier 273 has its output applied to input 276 of summer 277; the output of summer 277 is applied to input 278 of multiplier 275. The output of multiplier 275 is applied to the input 279 of summer 280; the output of summer 280 constitutes the output 281 of feedforward model 285.

Three constants, which for the purpose of this discussion we may term $a$, $b$ and $c$, are supplied to model 285. Constant $a$ is supplied to input 282 of multiplier 273; constant $b$ is supplied to input 283 of summer 277; and constant $c$ is supplied to input 284 of summer 280.

The uncontrolled variable at input 286 for the purpose of this discussion may be represented by the term $x$. Multiplier 273 multiplies $x$ by constant $a$ and therefore produces an output supplied to summer 277 representing $ax$. To this term $ax$ summer 277 adds constant $b$; therefore, the output of summer 277 supplied to input 278 of multiplier 275 is a term $ax+b$. Multiplier 275 multiplies the term $ax+b$ by the original factor $x$, thus yielding the term at the output of multiplier 275:

$$ax^2 + bx$$

To this last term summer 280 adds constant $c$, and the output of summer 280 which is the output of the feedforward model 285 becomes:

$$ax^2 + bx + c$$

This formula will be recognized as the basic quadratic equation. Proper adjustment of this model will permit the use of satisfactory control of a process having a substantial exponential nonlinearity.

In the model 285, constant $c$ adjusts the zero bias; constant $b$ adjusts the proportionality between uncontrolled variable and valve; and constant $a$ adjusts the quadratic relationship between the uncontrolled variable and valve.

The model of FIG. 8 may be employed in a control system similar to those illustrated above, with the addition of switching logic adapted to supply an integrated measurement deviation as constant $a$ to multiplier 273 representing the quadratic term adjustment for model 285.

The conditions for adjustment of each constant must be ordered with respect to one another. In the quadratic model, constant $c$, the zero bias, must be readjusted in response to lower uncontrolled variable measurements than those measurements selected for initiating readjustment of any other constant in the model. Constant $b$, the proportional adjustment, must be varied in response to an uncontrolled variable measurement higher than the last measurement selected for varying the zero bias if the last readjustment of the model was a zero adjustment, and the proportional adjustment must be varied in response to an uncontrolled variable measurement lower than the last uncontrolled variable measurement selected for controlling the quadratic constant if the last readjustment was a quadratic adjustment. Constant $a$, the quadratic adjustment, must be varied in response to an uncontrolled variable measurement higher than the last measurements employed to control another constant in the feedforward model. In general, for a polynomial model, the ranges of adaptation for the constants must be ordered as the exponents of the terms corresponding to the constants.

It is advantageous to specify a dead-band between ranges of uncontrolled variable measurements employed to adjust respective constants of the model. Accordingly, a practical method of implementing the logic necessary for adjusting the feedforward model 285 of FIG. 8, may be built upon the level detecting method illustrated in FIG. 3. Uncontrolled variable measurements from zero up to a specified value would be employed for initiating adjustment of constant $c$, and the logic would enable the loop controlling constant $c$ whenever the uncontrolled variable measurement was in that range. At a certain predetermined level higher still than the highest range of constant $c$ control, the logic would switch in the proportional loop for controlling constant $b$, thus providing a dead-band between enabling of the zero loop and enabling of the proportional loop. A predetermined high measurement of the uncontrolled variable would be employed for limiting the range of proportional loop control. At a highest predetermined level, higher than the top of the proportional range of control, the quadratic constant may be brought in, and all uncontrolled variable measurements higher than this level would control the quadratic loop.

For other types of processes, including those which tend to operate at a particular limited range of uncontrolled variables with momentary and infrequent excursions therefrom, it may be more practical to provide a logic based on a direction-sensing system such as those discussed in connection with FIGS. 5 and 6. During an increase of the uncontrolled variable measurement, proportional adjustment could be made only after a previous zero adjustment, and the quadratic adjustment could be made only after a previous proportional adjustment. Similarly, in decreasing uncontrolled variable measurements, the proportional adjustment could be made only after a quadratic adjustment and a zero adjustment could be made only after a proportional adjustment. In this arrangement, then, if the uncontrolled variable strictly alternates in a narrow band of measurements, no quadratic adjustment might be made. Only after two successive increases in the uncontrolled variable separated by preselected dead-band timing would be quadratic adjustment be called in. The best method for adjusting a quadratic model may be determined by observation of the use of that model with a particular process. Other types of logic and procedures for adjusting a quadratic model may be suitable, such as a procedure based on programming.

More complex feedforward models may be built as required simply by adding appropriate mathematical functions. In general, the constant model of the form:

$$ax^n + bx^m + cx^1$$

may be employed. The exponents $m$ and $n$ and 1 may be of any suitable power.

Figure 9:
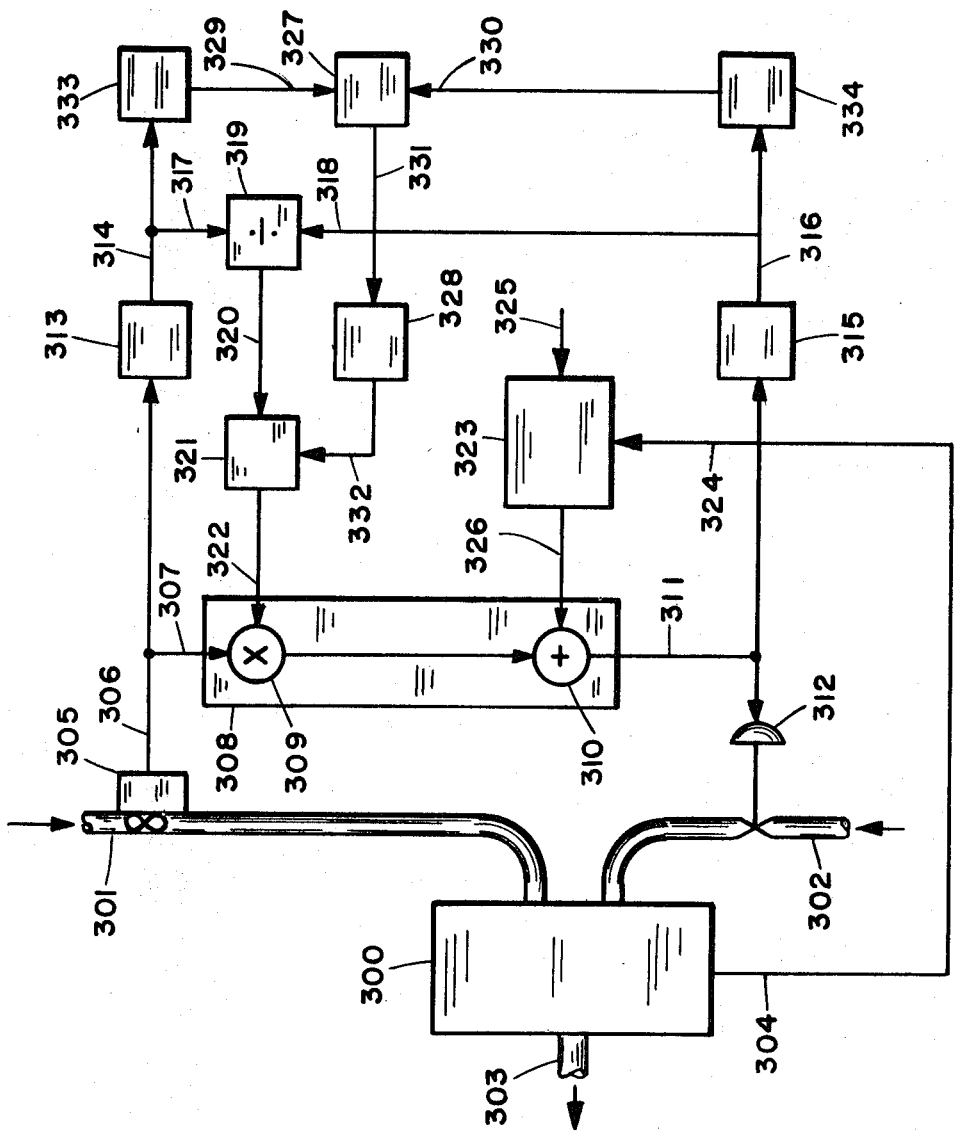
FIG. 9 shows a block diagram of an adapting feedforward control based on a continuous method.

Referring to FIG. 9, an alternate method of controlling the constants of a feedforward model is illustrated. With this method the proportional and bias adjustments are continually and simultaneously updated to match the process as closely as possible.

Process 300 has an uncontrolled variable input at input 301 and a controlled variable at input 302. Process 300 has output 303 therefrom, and process measurement 304 is to be controlled to set point 325. Flowmeter 305 has an output 306 constituting a signal proportional to the flow rate of the uncontrolled variable at input 301. Signal 306 is applied to the input 307 of feedforward model 308. Feedforward model 308 is comprised of multiplier 309 and summer 310. Output 311 of feedforward model 308 supplies control to valve 312 which regulates the controlled variable at input 302.

The flow rate signal 306 is also applied to band pass filter 313 having an output 314 proportional to a short term averaged rate of change of flow rate signal 306. Valve control signal 311 at the output of feedforward model 308 is applied to the input of band pass filter 315 having an output 316 corresponding to a short term averaged rate of change of the valve control signal. Outputs 314 and 316 of band pass filters 313 and 315 respectively are applied to the inputs 317 and 318 of divider 319. Output 320 of divider 319 is therefore the ratio between the averaged rate of change of the flow rate and the valve control signal averaged rate of change. Output 320 is applied to the input of a controlled lag or averaging circuit 321, and the output of lag circuit 321 is applied to input 322 of multiplier 309 of the feedforward model 308.

A conventional proportional plus reset controller 323 continually operates with the process through summer 310 of the feedforward model 308. Measurement 304 from the process is applied to input 324 of controller 323, and set point 325 provides the reference with respect to which measurement deviation is calculated. Output 326 of controller 323 depends on measurement deviation from set point 325. Output 326 is supplied through summer 310 of feedforward model 308 to control valve 312. The feedback loop operating through controller 323 and summer 310 acts in a conventional manner, thereby providing an output 326 of controller 323 to the input of summer 310 representing the required level to maintain measurement 304 at set point.

The valve 312 setting is equal to the proportional setting at input 322 of model 308 times the uncontrolled variable measurement plus a bias 326 from controller 323. Thus, the change in valve setting is equal to the setting times the change in the uncontrolled variable so long as the bias remains fixed. When the proportional factor is correct the uncontrolled variable changes have a ratio to valve changes that operates to maintain measurement 304 at set point 325. Band-pass filter 313 and 315 are arranged in conjunction with divider 319 to calculate the required ratio from operating information. Should the proportional constant be in error, a change in the uncontrolled variable will order an incorrect valve position. This error in valve position will show up as a measurement 304 deviation from set point of controller 323, and controller 323 will reposition valve 312 by feedback control. The change in valve 312 ordered by the combination of feedback and feedforward control also is an input to band-pass filter 315. The lagging or averaging action of the band-pass filter converts valve commands occurring over a given space of time into a slowly varying signal which represents the short term average valve action required to keep the output measurement on set point under the action of the uncontrolled variable. This slowly varying signal is applied to divider 319 which then produces a calculation of the proportional constant which is averaged by lag circuit 321. The output of lag circuit 321 then sets the required proportional constant at input 322 of feedforward model 308.

The band-pass filter is essential to the scheme. The low-frequency cutoff of the filter removes the steady state information from the signal which corresponds most to bias information; the low-frequency cutoff gives a rate taking action to he filter. The high-frequency cutoff prevents adaptation on signals whose response time is smaller than the process response time; the high-frequency cutoff also has the effect of averaging or summing the total valve action together whether it occurred directly from feedforward or indirectly from feedback.

A protection circuit consisting of absolute value computers 333 and 334, selector 327 and function generator 328 is provided to deactivate lag circuit 321 when either signal 314 or signal 316 is too small in magnitude. Output 314 and output 316 are supplied to computers 333 and 334 which in turn supply the absolute values of the signals 314 and 316 to inputs 329 and 330 of selector 327. Output 331 of selector 327 equals the lesser of the inputs 329 and 330. Output 331 is converted by function generator 328 to enable log circuit 321 when both signals at inputs 329 and 330 are significantly present and to disable lag circuit 321 when either signal falls below a level yielding reliable information. Such a circuit prevents erroneous adaptation by signals so small as to be predominantly noise signals.

Figure 10:
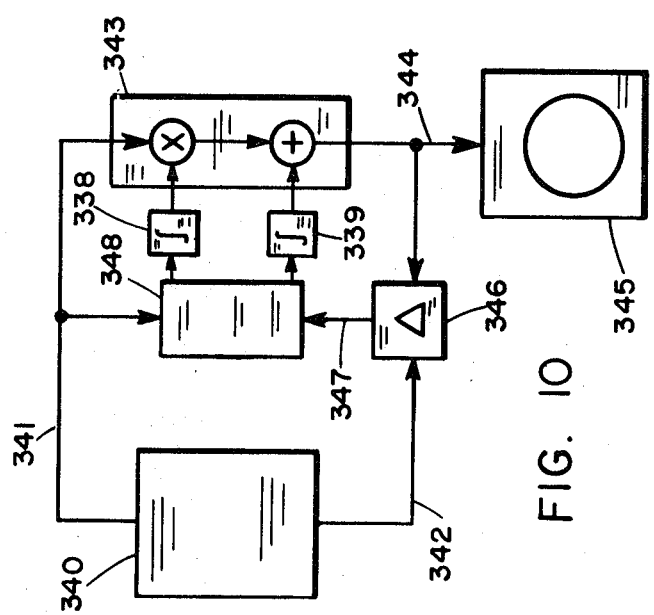
FIG. 10 shows a block diagram of an embodiment of the invention employed in a calibrating application.

Referring to FIG. 10, a block diagram is illustrated representing an application of a self-adapting model for calibrating an inaccurate measurement using a slow accurate measurement. Process 340 has a fast inaccurate measurement output 341 and a slow accurate output measurement 342. Output 341 is supplied to feedforward model 343 which has an output 344 connected to recorder 345. The output of feedforward model 343 is also connected to an input of differencer 346 and slow accurate measurement 342 is connected to the other input of differencer 346. Output 347 of differencer 346 represents the deviation of the calibrated fast inaccurate measurement 341 from the slow accurate measurement 342.

During such times as the slow accurate measurement is present and fast inaccurate measurement 341 achieves a significantly different setting from a last reading, switching logic 348 employs the error in calibrated measurement 344 appearing at output 347 to reset the appropriate proportional or bias level supplied by the integrators to feedforward model 343. Logic 348 selects the resetting of the proportional level by integrator 338 for higher ranges of measurement readings and selects the resetting of the bias or zero level by integrator 339 for lower ranges of measurement readings. Switching logic 348 may be based on logic schemes discussed in connection with other embodiments of the invention.

If slow accurate measurement 342 lags fast inaccurate measurement 341 appreciably, it may be advantageous to average calibrated measurement 344 before comparison with measurement 342 in order to obtain a long term representation of the relation between measurements 341 and the calibrated measurement 344.

The embodiment of FIG. 10 may, in general, be employed to calibrate an inaccurate measurement having desirable features such as speed or rangeability against an accurate measurement not having such features. Calibration effectively endows the inaccurate measurement with features of the accurate measurement. Model 343 represents the relationship between the accurate and inaccurate measurements.

Figure 11:
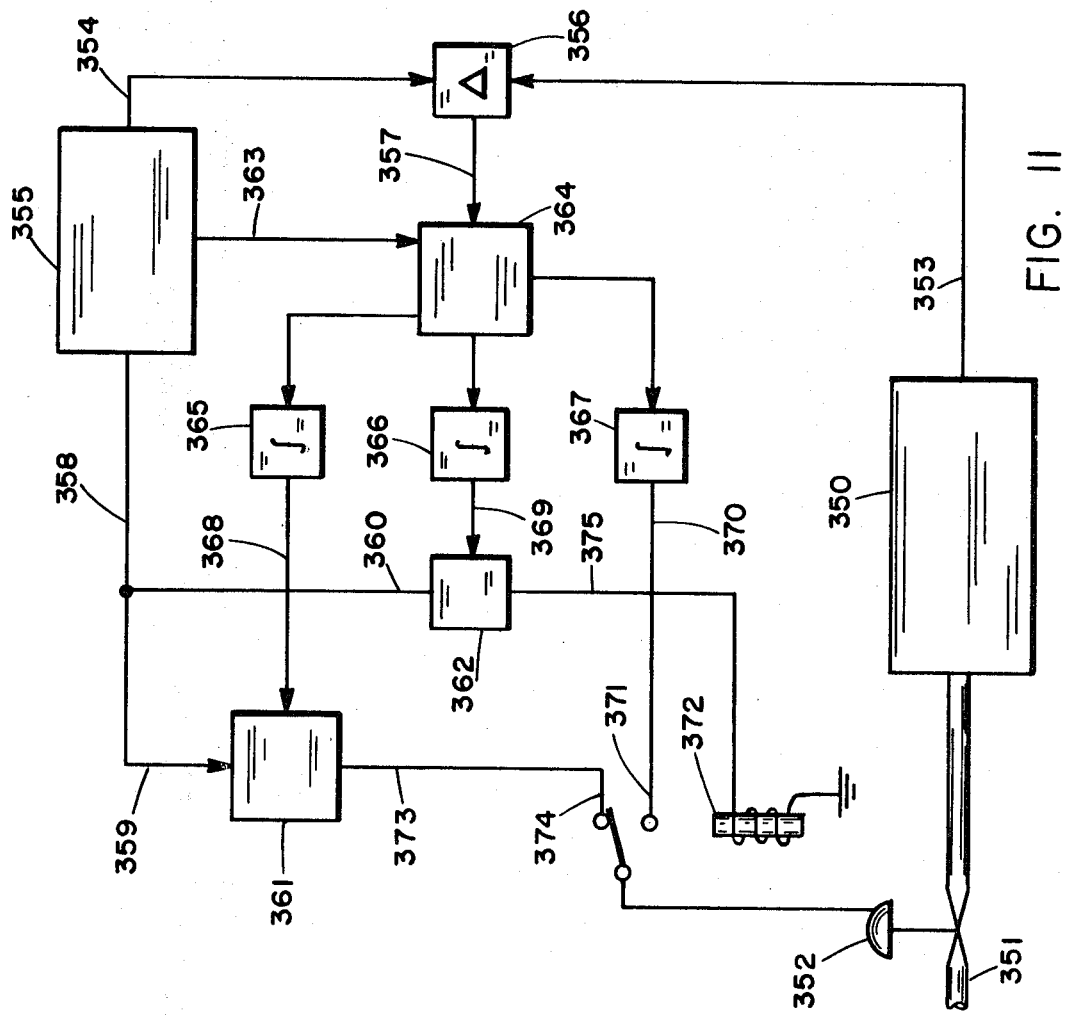
FIG. 11 shows a block diagram of an embodiment of the invention employed in a specialized control application having a programmed step change in the process set point.

Referring now to FIG. 11, a block diagram of self-adaptive switching scheme for a specialized application is illustrated. This scheme is designed to bring a process to a changed set point as quickly as possible and as closely as possible at a given programmed time.

To accomplish this objective, the operating procedure for the valve regulating the controlled variable may be based on the "bang-bang" control theory. To obtain the most precipitate change in the process measurement, the valve is turned full on at a selected point in time, maintained in the full on position for a selected period of time, then finally backed off to a position in accordance with the maintenance of the process measurement at the desired set point. Thus, three different characteristics of valve operation may be specified: time for initial full opening, time for partial closure, and appropriate final position. The self-adaptive scheme of FIG. 11 offers a means of automatically determining each of these valve characteristics.

Process 350 has controlled variable input 351 which is regulated by valve 352. Process measurement 353 is to be regulated to a set point 354 programmed as a step in time by programmer 355. The measurement 353 and the programmed set point 354 are provided as inputs to differencer 356, the output 357 of which represents the deviation of measurement from set point.

Programmer 355 has a timing ramp output (358) varying proportionally with time which is applied to input 359 and 360 of level detectors 361 and 362 respectively. Gate output 363 of programmer 365 controls switching network 364 to which measurement deviation signal 357 is applied as input. The gating signal 363 operates in conjunction with switching network 364 to switch measurement deviation signal 357 to the input of integrators 365, 366 and 367 successively according to a predetermined program. The successive switching of the measurement deviation signal 357 to the integrators may be exclusive so that only one integrator receives such signal 357 at a time or in the alternative, the programming may overlap providing signal 357 to more than one integrator at a time. Output 368 of integrator 365 is applied to control the set point of level detector 361. Output 369 of integrator 366 is applied to control the set point of level detector 362. Output 370 of integrator 367 is supplied to the energized position 371 of relay 372. The output 373 of level detector 361 is applied to the deenergized position 374 of relay 372. Output 375 of level detector 362 is applied to the coil of relay 372. The programmed timing ramp 358, applied to input 359 of level detector 361 reaches the set point determined by input 368 of level detector 361 and thereby activates its output 373. Thereupon the activated output 373 of level detector 361 connected through position 374 of relay 372, sets valve 352 to a full on condition.

Next in sequence of operation, the level of timing ramp 358 will reach the set point determined by input 369 of level detector 362 so that output 375 of level detector 362 thereupon energizes the coil of relay 372. Upon energization of relay 372, the control of valve 352 is switched through contact 371 of the relay to the output 370 of integrator 367. Output 370 then determines the final position of valve 352 proper to maintain desired measurement 353 at set point 354.

During this sequence of valve actuation by level detectors 361 and 362, the set point program 354 is compared with measurement 353 and any error 357 is applied to the input of switch 364. Switch 364 is programmed by gating signal 363 to switch error 357 to integrators 365, 366 and 367. At an appropriate first predetermined time gating signal 363 switches error signal 357 to the input of integrator 365. The object of varying the set point of level detector 361 is to actuate valve 352 at such a time that the resulting change in measurement 353 will coincide as closely as possible with the programmed step change of set point 354. Set point 354 is a step change in level, while the change of measurement 353 will probably be less precipitate. If integrator 365 integrates error 357 over such time as measurement 353 takes to go from its initial level to the level resulting from the first valve actuation, the integrated error will be zero only when the set point 354 step occurs at some median point in the change of measurement 353 such that the negative integrated error equals the positive integrated error and thereby cancels it. In other words, an initial rise in measurement 353 must anticipate the step change of set point 354 by a sufficient amount to yield an integrated error which will subsequently be cancelled by the integrated error of opposite polarity resulting from the lag in the rise of measurement 353 after the step change of set point 354. Output 368 of integrator 365 adjusts the set point of level detector 361 in such a direction that the integrated error 357 averages to a minimum. When this set point position is achieved for level detector 361, valve 352 is actuated at the most appropriate time to line up the slope of measurement rise 353 with the step change of set point 354 as close as may be possible.

At a second predetermined time gating signal 363 switches error 357 to the input of integrator 366 whose output 369 controls the set point of level detector 362. The period during which switch 364 applies error 357 to integrator 366 is a period occurring after the step change in set point 354. The set point 354 level is compared with measurement 353, and the error 357 represents the overshoot or undershoot of measurement 353 determined by the time valve 352 is returned to an intermediate position from full on. Integrator 366 integrates this overshoot or undershoot and adjusts set point 369 of level detector 362 in such a manner that relay 372 is actuated at an appropriate time for valve 352 to be returned to an intermediate position thereby minimizing any overshoot or undershoot of measurement 353.

At the third predetermined point in time, gating signal 363 switches error 357 to integrator 367. At this time, error 357 is no longer connected to either of the other integrators 365 or 366. Integrator 367 operates through energized position 371 or relay 372 in a conventional feedback loop whereby the measurement deviation from set point operates valve 352 in a manner to bring the process back to set point. Thereby, signal 370 at the output of integrator 367 achieves the level appropriate to position valve 352.

Thus, in this manner the time for switching on valve 362 is appropriately adjusted, the time for returning valve 362 to an operating level is also appropriately adjusted, and the operating position of the valve is also adjusted, all functions being performed automatically. The gating signal 363 program may be predetermined as the times involved in switching the error 357 to the integrators is not critical. Other methods of operating switch 364 may be used, such as deriving some of the timing for gating signal 363 from process functions.

An advantage of the embodiment of FIG. 11 is its capability of adapting a sequential series of programmed step changes. It would be convenient to repeat a computer embodiment thereof for each step change, thereby adapting a sequence of valve operations.

To operate a batch process in which a step change in set point occurs at an unpredicted time, detector 361 and integrator 365 associated therewith are omitted from the control. Valve 352 is turned full on at the moment the step change occurs, and the control scheme determines the duration valve 352 is full on for minimum overshoot and its final value.

Figure 12:
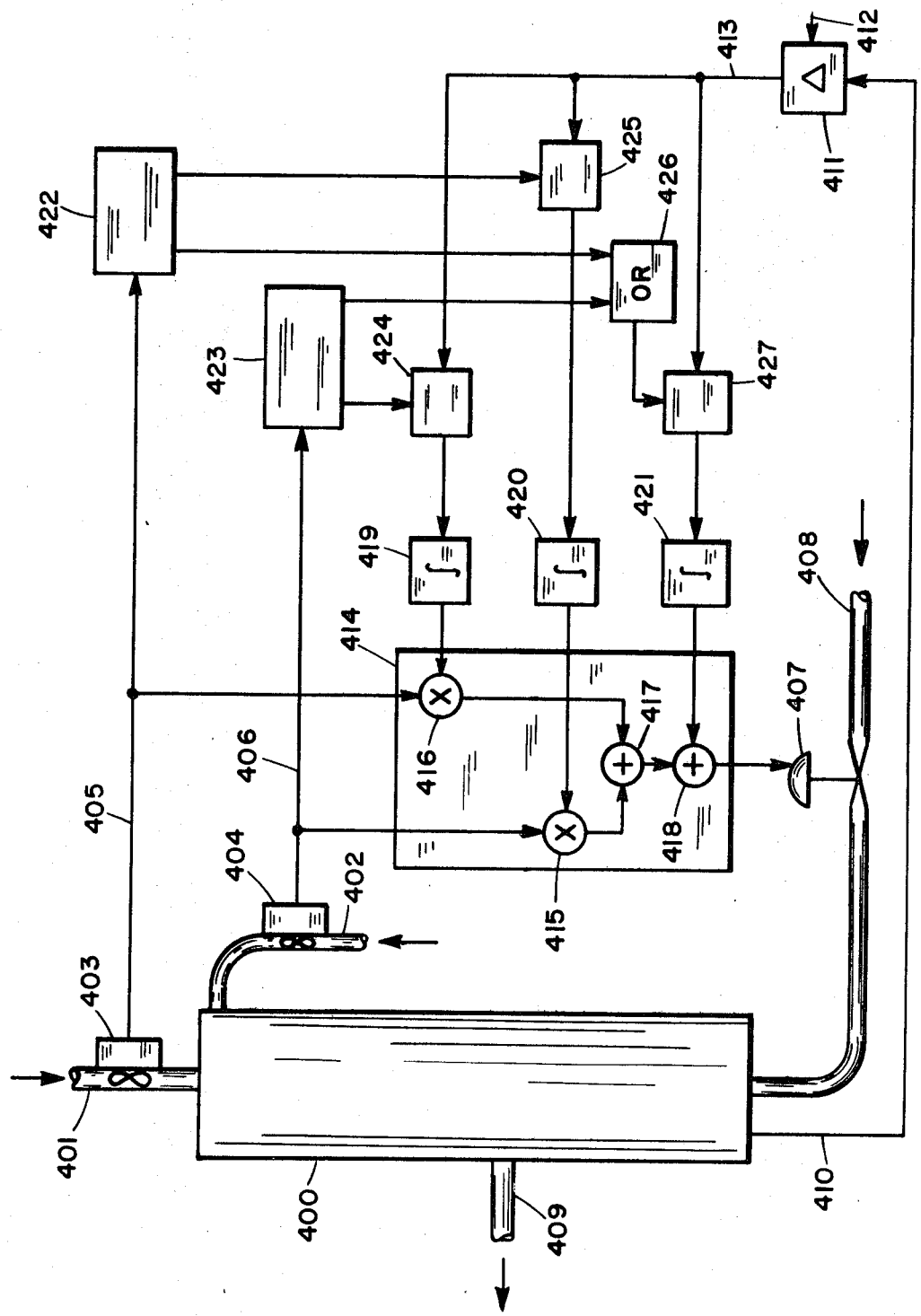
FIG. 12 shows a block diagram of an embodiment of the invention employed for control of a process having two independent variables.

Referring to FIG. 12, a self-adaptive feedforward system is shown operating in conjunction with two uncontrolled variables. Each uncontrolled variable actuates an individual logic system which in turn readjusts the proportional constant related to a particular uncontrolled variable.

Process 400 has uncontrolled variable inputs 401 and 402 monitored by meters 403 and 404 respectively having outputs signifying uncontrolled variables 405 and 406 respectively. Valve 407 regulates controlled variable inputs 408 to process 400. Process measurement 410 is supplied to differencer 411 which has a set point input 412, thereby producing output 413 thereof representing measurement deviation from set point. Feedforward model 414 contains three constants. The uncontrolled variable signal 406 is multiplied by proportional constant 415 and uncontrolled variable signal 405 is multiplied by proportional constant 416. The modified uncontrolled variable signals are simply summed at point 417 and applied through bias constant summer 418 to control valve 407.

Proportional constant multiplier 416 has an input from integrator 419, proportional constant multiplier 415 has an input from integrator 420, and bias summer 418 has an input from integrator 421.

Logic system 422 has an input signal 405 representing uncontrolled variable 401, and logic system 423 has an input signal 406 representing uncontrolled variable 402. A positive-going deviation of sufficient rate and magnitude in uncontrolled variable 405 or 406 will actuate its respective logic control system 422 or 423. Logic control system 423 controls switch 424 directly. Switch 424 connects error signal 413 to the input of integrator 419 thereby readjusting the proportional constant modifying uncontrolled variable 405 according to the magnitude of error 413. Logic system 422 directly controls switch 425 which switches error 413 to the input of integrator 420 adjusting the proportional constant modifying uncontrolled variable 406. In addition, logic system 422 and 423 both supply control signals to OR-gate 426 so that should either logic system be in operation switch 427 disconnects error 413 from bias integrator 421. Thereby adaptation of the appropriate proportional term takes place upon a significant change in either uncontrolled variable, and adaptation of the mutual bias term is discontinued at such times.

In general, with a plurality of uncontrolled variables, at those times only one variable is significantly changing, that particular variable should effectively initiate adaptation of a related model constant. When more than one uncontrolled variable is significantly changing simultaneously, a decision must be made to adapt all the constants simultaneously, or to forego any adaptation in such an event.

If the decision is to restrict adaptation to the events of a single uncontrolled variable change, it must be on the basis that a sufficient number of such events occur to satisfactorily facilitate the adaptation process. If simultaneous changes in uncontrolled variables are more the rule in a process, it may be convenient to adapt all the constants. It is not then possible to determine which of the changing variables is responsible for the process measurement error, but this ambiguity will not prevent the adaptation process, particularly if sufficient changes in only one variable occur.

Two possible circumstances limit the adverse consequences of such an ambiguity: It may be that the two uncontrolled variables are in fact correlated when they act simultaneously. In this case the effective feedforward action on the valve will be the same no matter to which variable the upset is attributed. Also, if two constants are adjusted simultaneously when only one of the corresponding uncontrolled variables is changing, the constant in the feedforward path of this variable will be changed in the right direction. Then any single variable changes involving the other variable will permit adaptation to correct any error introduced by a previous two-constant adaptation in the constants in the feedforward path of this other variable.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A method for adjusting factors each in one of a plurality of mathematical functions that express an estimate of the relationship between the value of an independent system variable and the required value of a dependent system variable for minimizing a measured error in a system wherein said estimate is employed to compute the regulation of said dependent system variable from the value of said independent system variable comprising the steps of:

ascertaining a change in the condition of said independent system variable, selecting in accordance with said change one of said factors for adjusting, and adjusting the value of said selected factor in a manner tending to reduce said measured system error said adjusting thereby tending to optimize said estimate.

2. The method of claim 1 wherein the step of ascertaining a change in the condition of said independent system variable is based upon discrimination of a change in value of said independent system variable.

3. The method of claim 1 wherein the step ascertaining a change in the condition of said independent system variable is based upon detection of a predetermined minimum change in said condition so that said change includes a sufficient change in value to insure adjusting the newly selected factor while said system experiences an appreciably new value of the independent variable.

4. The method of claim 1 wherein the step ascertaining a change in the condition of said independent system variable includes evaluation of the rate and magnitude of said change in condition.

5. The method of claim 1 wherein the step of adjusting the value of said selected factor employs an integration of system error for adjusting said value of said selected factor.

6. The method of claim 1 wherein said mathematical functions are terms in a polynomial and the step of selecting a factor for adjusting is performed in accordance with a predetermined rule employing the value of said independent system variable, so that upon the occurrence of a predetermined increase in the value of said independent system variable a selection in accordance with said rule is made of the factor of a term of said polynomial having a larger exponent relative to the exponent of the term of said polynomial that had its factor adjusted previously to said occurrence of said predetermined increase and upon the occurrence of a predetermined decrease in the value of said independent system variable a selection in accordance with said rule is made of the factor of a term of said polynomial having a smaller exponent relative to the exponent of the term of said polynomial that had its factor adjusted previously to said occurrence of said predetermined decrease.

7. The method of claim 6 wherein a particular factor is selected for adjusting in the step of selecting a factor during times the independent system variable does not minimally change thereby providing a feedback loop during such times based upon said system error operating through said particular factor selected to provide said regulation of said dependent system variable to maintain said system error at a minimum.

8. A method for adjusting factors each in one of a plurality of terms in a polynomial that express an estimate of the relationship between the value of an independent system variable and the required value of a dependent system variable for minimizing measured error in a system wherein said estimate is employed to compute the regulation of said dependent system variable from the value of said independent system variable comprising the steps of:
ascertaining the direction of any change of the value of said independent system variable exceeding a predetermined magnitude,
selecting one of said factors for adjusting in accordance with said direction so ascertained so that upon the occurrence of a predetermined increase in the value of said independent system variable a selection is made of the factor of a term of said polynomial having a larger exponent relative to the exponent of the term of said polynomial that had its factor adjusted previously to said occurrence of said increase and upon the occurrence of a predetermined decrease in the value of said independent system variable a selection is made of the factor of a mathematical operation having a smaller exponent relative to the exponent of the mathematical operation that its factor adjusted previously to said occurrence of said decrease,
adjusting the value of said selected factor in a manner tending to reduce said measured system error thereby optimizing said selected factor so that said polynomial estimate of said relationship between said variable is improved.

9. The method of claim 8 incorporating a time delay in the step of selecting so that a time delay is inserted between successive adjustments of alternate factors.

10. A method for correcting an inaccurate system measurement by reference to an accurate system measurement wherein an estimate of the relationship between said inaccurate system measurement and said accurate system measurement is represented by a model performing a plurality of mathematical operations each operation having an adjustable factor and said model having an input responsive to said inaccurate measurement and having an output representing a correction of said inaccurate measurement comprising the steps of:
selecting in accordance with a change in the condition of one of said measurements one of said factors for adjusting, and
adjusting the value of said selected factor using the value of the accumulated deviation in said inaccurate measurement from said accurate measurement in a manner tending to reduce said deviation said adjusting thereby optimizing said estimate.

11. The method of claim 10 wherein the step of selecting in accordance with the condition of a measurement employs said inaccurate system measurement.

12. The method of claim 10 wherein the step of selecting in accordance with the condition of a measurement employs said accurate system measurement.

13. A method for adjusting factors one in an additive mathematical operation and one in a multiplicative mathematical operation said operations together expressing a linear estimate of the relationship between the value of an independent system variable and the required value of a dependent system variable for minimizing measured error in a system wherein said linear estimate is employed to compute the regulation of said dependent system variable from the value of said independent system variable comprising the steps or:
ascertaining the occurrence of a predetermined change in value of said independent system variable,
selecting one of said factors in accordance with the direction of said occurrence so that for an increasing change in value of said independent system variable a selection is made of said multiplicative factor and for a decreasing change in value of said independent system variable a selection is made of said additive factor,
integrating said system error, and
employing the value of said integrated system error for the adjusted value of said selected factor in a manner tending to reduce said measured system error so that said estimate is improved.

14. The method of claim 13 wherein one of said factors is selected during times said independent system variable is stable thereby forming a feedback path through the selected factor to said dependent system variable thereby minimizing said measured system error.

15. An adapting control apparatus for a system having a significant relationship between the value of an independent system variable and the required value of a controlled system variable for minimizing measured system error comprising:
a mathematical model estimating said relationship performing an additive operation and a multiplicative operation each operation having an adjustable factor and said mathematical model having an input responsive to the value of said independent system variable and having a computed output for regulating said controlled system variable,
a feedback controller having an input responsive to said measured system error and having an output for adjusting said factor of said additive operation,
a first band-pass filter having an input responsive to the value of said independent system variable and having an output,
a second band-pass filter having an input responsive to the value of said controlled system variable and having an output,
means for determining the ratio between the outputs of said first and second band-pass filters and having an output signifying said ratio,
an averaging device responsive to said output of said means for determining the ratio having an output for adjusting said factor of said multiplicative operation and having a controllable time constant whereby the time constant of said averaging device may be set to maintain said output of said averaging device at its last level for an indefinite time, and
a circuit responsive to said outputs of said first and second band-pass filters and having an output controlling said controllable time constant of said averaging device whereby said time constant is set to maintain said output of said averaging device at its last level for an indefinite time if the absolute value of said output of either said first or second band-pass filters is less than some minimum predetermined value.

16. An adapting control apparatus for a system having a significant relationship between the value of an independent system variable and the required value of a controlled system variable for minimizing measured system error comprising:
a mathematical model estimating said relationship performing a plurality of operations each operations having an adjustable factor and said mathematical model having an input responsive to the value of said independent system variable and having a computed output for regulating said controlled system variable whereby said controlled system variable is regulated according to the relationship estimated by said mathematical model, and a plurality of adjusting means one for each said adjustable factor each adjusting means having an output for adjusting the value of its respective factor and each having an input which is made responsive to a signal representing said system error in accordance with a predetermined rule employing the value of said independent variable thereby forming a feedback path from said system error to said controller variable said path including the one of said adjusting means in accordance with said rule made responsive to a signal representing system error and including the one of said plurality of operations of said model having its factor thereby selected for adjusting by said adjusting means.

17. An adapting control apparatus for a process wherein there exists a determinable relation between the value of an independent process variable and the required value of a controlled process variable for maintaining a process measurement at a process set point comprising:

a feedforward model responsive to the value of said independent process variable performing an additive mathematical operation having an adjustable bias factor and performing a multiplicative mathematical operation having an adjustable proportional factor said operations expressing a linear estimate of said relationship and said model having an output for regulating said controlled process variable, means for adjusting said bias factor said means being responsive to a signal representing said process measurement deviation from said process set point upon the occurrence of a predetermined change of the value of said independent process variable in a decreasing direction, means for adjusting said proportional factor being responsive to said signal upon the occurrence of a predetermined change of the value of said independent process variable in an increasing direction, whereby the one of said factors adjusted by the one of said means for adjusting responsive to said signal is thereby included in a feedback loop with said process so that said signal tends to adjust said factor adjusted in a manner to make said output of said model regulate said controlled process variable to bring said process measurement to said process set point and whereby the successive adjusting of said bias factor and said proportional factor serves to make said linear estimate more closely approximate said relationship.

18. The apparatus of claim 17 wherein one of the factors of said feedforward model is selected for adjusting during times that said independent variable is substantially stable.

19. The apparatus of claim 16 wherein said mathematical model consists of a polynomial and said predetermined rule is based on a predetermined change of magnitude and direction of said value of said independent variable so that upon the occurrence of a predetermined increase in the value of said independent system variable a selection is made of the factor of a term of said polynomial having a larger exponent relative to the exponent of the term of said polynomial that had its factor adjusted previously to said occurrence of said predetermined increase and upon the occurrence of a predetermined decrease in the value of said independent system variable a selection is made of the factor of a term of said polynomial having a smaller exponent relative to the exponent of the term of said polynomial that had its factor adjusted previously to said occurrence of said predetermined decrease.

20. The apparatus of claim 17 including means for making said means for adjusting said bias factor responsive to said signal upon the occurrence of a predetermined change of the value of said independent process variable in a decreasing direction and including means for making said means for adjusting said proportional factor responsive to said signal upon the occurrence of a predetermined change of the value of said independent process variable in an increasing direction.

21. The apparatus of claim 17 including means for providing a time delay between operation of said means for adjusting said bias factor and operation of said means for adjusting said proportional factor whereby alternating operation of said respective means incorporates said time delay between each alternation.

22. The apparatus of claim 17 wherein a varying set point is substituted for said independent process variable whereby said model is adapted to estimate the relationship between said varying set point and said controlled process variable.

23. The apparatus of claim 17 wherein said process has a plurality of independent process variables each having a determinable relationship with said controlled process variable for maintaining a process measurement at a process set point, said control apparatus including an additional proportional factor for each additional independent process variable.

24. The apparatus of claim 23 wherein said bias factor performs the additive mathematical operations for all of the additional independent variables.

25. The apparatus of claim 23 with logic for deciding the appropriate factor for adjusting when more than one independent variable changes simultaneously.

26. An adapting control apparatus for a system employing a varying set point wherein a system valve is manipulated to control a system measurement to follow said varying set point comprising:

means for setting said valve to one of its two extreme positions in accordance with the direction of a variation in said set point, means for setting said valve to a relatively long term position in accordance with a relatively long term value of said varying set point, a first adjusting means responsive to the instantaneous deviation of said system measurement from said system set point during a first period determined in accordance with a predetermined rule and having an output adjusting the instant for setting said valve to its relatively long term position, and a second adjusting means responsive to the instantaneous deviation of said system measurement from said set point during a second period determined in accordance with said rule and having an output adjusting said valve to its relatively long term position thereby adjusting said manipulation of said valve in a manner to make said system measurement follow closely said varying set point.

27. The control apparatus of claim 26 in which said varying set point includes step changes.

28. The adapting control apparatus of claim 26 including a prior adjusting means responsive to the instantaneous deviation of said system measurement from said system set point during a period prior to said first period determined in accordance with said rule and having an output adjusting the instant for setting said valve to one of its two extreme positions.

29. The adapting control apparatus of claim 26 wherein said rule is based on the value of said system measurement.

30. The adapting control apparatus of claim 26 wherein said rule is based on the value of said varying set point.

31. The adapting control apparatus of claim 26 including means for setting said valve to the opposite of said one of its two extreme positions thereby providing for alternation of said valve between the two extreme positions for a predetermined number of times and including adjusting means for adjusting each instant for setting said valve to said opposite position responsive to said deviation during a predetermined period.

32. A method for adjusting a valve program for making a system measurement follow a variation in system set point comprising the steps of:

determining first time for turning a valve full on by reference to the deviation of a system measurement change from a system step change in set point during a first predetermined period, determining the time for positioning said valve to an intermediate position by reference to the deviation of said system measurement from said set point during a second predetermined period, and determining said intermediate position of said valve by reference to the deviation of said system measurement from said set point during a third predetermined period.

33. Apparatus for adjusting factors, each in one of a plurality of mathematical functions that express an estimate of the value of an independent system variable and the required value of a dependent system variable for minimizing a measured error in a system wherein said estimate is used to compute the regulation of said dependent system variable from the value of said independent system variable, comprising:
    means for ascertaining a change in the condition of said independent system variable,
    means for selecting in accordance with said change one of said factors for adjusting, and
    means for adjusting the value of said selected factor in a manner tending to reduce said measured system error, said adjusting thereby tending to optimize said estimate.

34. The apparatus of claim 33 wherein said independent system variable is a varying set point.

35. The apparatus of claim 33 wherein said independent system variable is a varying set point and said means for selecting operates in accordance with a change in the value of the measured error.

36. The method of claim 1 wherein said independent system variable is a varying set point.

37. The method of claim 1 wherein said independent system variable is a varying set point and said step of selecting is performed in accordance with a change in the value of the measured error.